(12) United States Patent
Hidaka et al.

(10) Patent No.: US 11,713,071 B2
(45) Date of Patent: Aug. 1, 2023

(54) VEHICLE WITH FOUR WHEEL STEERING SYSTEM

(71) Applicant: AISIN CORPORATION, Kariya (JP)

(72) Inventors: Seiji Hidaka, Kariya (JP); Shin Kunieda, Kariya (JP)

(73) Assignee: AISIN CORPORATION, Aichi (JP)

( * ) Notice: Subject to any disclaimer, the term of this patent is extended or adjusted under 35 U.S.C. 154(b) by 480 days.

(21) Appl. No.: 16/496,660

(22) PCT Filed: Sep. 1, 2017

(86) PCT No.: PCT/JP2017/031676
§ 371 (c)(1),
(2) Date: Sep. 23, 2019

(87) PCT Pub. No.: WO2018/173317
PCT Pub. Date: Sep. 27, 2018

(65) Prior Publication Data
US 2020/0377150 A1 Dec. 3, 2020

(30) Foreign Application Priority Data
Mar. 24, 2017 (JP) ................................. 2017-059025

(51) Int. Cl.
*B62D 5/00* (2006.01)
*B62D 5/04* (2006.01)
(Continued)

(52) U.S. Cl.
CPC ............. *B62D 7/14* (2013.01); *B62D 5/0484* (2013.01); *B62D 6/00* (2013.01); *B62D 15/021* (2013.01)

(58) Field of Classification Search
None
See application file for complete search history.

(56) References Cited

U.S. PATENT DOCUMENTS

| 9,637,167 | B2 | 5/2017 | Miyasaka |
| 2002/0038171 | A1* | 3/2002 | Deguchi ............ B62D 15/0265 180/443 |

(Continued)

FOREIGN PATENT DOCUMENTS

| JP | 037670 A | 1/1991 |
| JP | 04143170 A | 5/1992 |

(Continued)

OTHER PUBLICATIONS

English translation of Takashi's JP2003-095122A through google patents. (Year: 2003).*

(Continued)

*Primary Examiner* — Adam D Tissot
*Assistant Examiner* — Laura E Linhardt
(74) *Attorney, Agent, or Firm* — Buchanan Ingersoll & Rooney PC

(57) ABSTRACT

A vehicle includes first and second steering drivers that steer first and second wheel pairs, a lock that locks the first wheel pair to be non-steerable, a first steering controller that controls the first steering driver in accordance with a first steering angle, and a second steering controller that controls the second steering driver in accordance with a second steering angle. The first steering controller controls the lock to lock the steering of the first wheel pair upon detecting anomaly in the steering of the first wheel pair from the steering angle and a steering detection angle of the first wheel pair. The second steering controller controls the second steering driver in accordance with a second corrected steering angle, if the steering of the first wheel pair exhibits anomaly.

8 Claims, 9 Drawing Sheets

(51) Int. Cl.
  *B62D 7/15*   (2006.01)
  *B62D 9/00*   (2006.01)
  *B62D 6/00*   (2006.01)
  *B62D 7/14*   (2006.01)
  *B62D 15/02*  (2006.01)

(56) References Cited

U.S. PATENT DOCUMENTS

| | | | | |
|---|---|---|---|---|
| 2002/0140198 | A1* | 10/2002 | Cole | B62D 5/0418 |
| | | | | 280/93.51 |
| 2008/0289897 | A1* | 11/2008 | Williams | B62D 5/001 |
| | | | | 180/402 |
| 2009/0210113 | A1 | 8/2009 | Auguet | |
| 2019/0152513 | A1* | 5/2019 | Awan | B62D 5/003 |

FOREIGN PATENT DOCUMENTS

| | | | |
|---|---|---|---|
| JP | H05-238403 A | 9/1993 | |
| JP | 2002225733 A | 8/2002 | |
| JP | 2003072582 A | * | 3/2003 |
| JP | 2003095122 A | | 4/2003 |
| JP | 2007015666 A | | 1/2007 |
| JP | 2007230511 A | | 9/2007 |
| JP | 2008-544917 A | | 12/2008 |
| JP | 5930058 B2 | | 6/2016 |

OTHER PUBLICATIONS

International Search Report (PCT/ISA/210) dated Nov. 21, 2017, by the Japanese Patent Office as the International Searching Authority for International Application No. PCT/JP2017/031676.

Written Opinion (PCT/ISA/237) dated Nov. 21, 2017, by the Japanese Patent Office as the International Searching Authority for International Application No. PCT/JP2017/031676.

Office Action (Notice of Reasons for Refusal) dated Nov. 4, 2020, by the Japanese Patent Office in corresponding Japanese Patent Application No. 2017-059025 and an English Translation of the Office Action. (9 pages).

* cited by examiner

FIG.3

FRONT-WHEEL STEERING ANGLE TABLE

70

| | STEERING ANGLE | | | |
|---|---|---|---|---|
| | $\theta_{S1}$ | $\theta_{S2}$ | ••• | $\theta_{SN}$ |
| LOW-SPEED FRONT-WHEEL STEERING ANGLE | $\theta_{FL1}$ | $\theta_{FL2}$ | ••• | $\theta_{FLN}$ |
| MEDIUM-SPEED FRONT-WHEEL STEERING ANGLE | $\theta_{FM1}$ | $\theta_{FM2}$ | ••• | $\theta_{FMN}$ |
| HIGH-SPEED FRONT-WHEEL STEERING ANGLE | $\theta_{FH1}$ | $\theta_{FH2}$ | ••• | $\theta_{FHN}$ |

FIG.4

REAR-WHEEL STEERING ANGLE TABLE

76

| | STEERING ANGLE | | | |
|---|---|---|---|---|
| | $\theta_{S1}$ | $\theta_{S2}$ | ••• | $\theta_{SN}$ |
| LOW-SPEED FRONT-WHEEL STEERING ANGLE | $\theta_{RL1}$ | $\theta_{RL2}$ | ••• | $\theta_{RLN}$ |
| MEDIUM-SPEED FRONT-WHEEL STEERING ANGLE | $\theta_{RM1}$ | $\theta_{RM2}$ | ••• | $\theta_{RMN}$ |
| HIGH-SPEED FRONT-WHEEL STEERING ANGLE | $\theta_{RH1}$ | $\theta_{RH2}$ | ••• | $\theta_{RHN}$ | ced with a speed of the vehicle.
VEHICLE WITH FOUR WHEEL STEERING SYSTEM

CROSS-REFERENCE TO RELATED APPLICATIONS

This application is national stage application of International Application No. PCT/JP2017/031676, filed Sep. 1, 2017, which designates the United States, incorporated herein by reference, and which claims the benefit of priority from Japanese Patent Application No. 2017-059025, filed Mar. 24, 2017, the entire contents of which are incorporated herein by reference.

TECHNICAL FIELD

The present invention relates generally to a vehicle.

BACKGROUND ART

Four-wheel steering vehicles that can steer the front and rear wheels by a steering such as a steering wheel are known. For the four-wheel steering vehicles, steer-by-wire systems are known that connect the steering to the wheel steering mechanism through, for example, wiring, to steer the wheels by transmitting steering-angle information by, for example, an electrical signal. It is known that the four-wheel steering vehicles include a mechanism to deal with a non-normal state of any part of the steering mechanism.

CITATION LIST

Patent Literature

Patent Document 1: Japanese Laid-open Patent Application Publication No. 2002-225733
Patent Document 2: Japanese Laid-open Patent Application Publication No. 2007-015666
Patent Document 3: Japanese Patent No. 5930058

Non-Patent Literature

Non-patent Literature 1: Masato Abe, Hiroshi Osawa, ed., "Automotive Dynamic Performance Improvement Technology", Asakura Publishing Co., Ltd., Aug. 20, 2008, pp. 109-125.

SUMMARY OF INVENTION

Problem to be Solved by the Invention

However, Such a mechanism may not be able to sufficiently deal with anomaly in steering of either of the front wheels and the rear wheels.

In view of the above, the present invention provides a vehicle that can appropriately deal with anomaly in steering of either of the front wheels and the rear wheels.

Means for Solving Problem

A vehicle according to one embodiment includes a first steering driver configured to steer a first wheel pair; a second steering driver configured to steer a second wheel pair; a steering with which the first wheel pair and the second wheel pair are steered; a detector configured to detect a steering detection angle serving as a steering angle of the first wheel pair; a lock configured to lock the first wheel pair so as to be non-steerable; a first steering controller configured to acquire information on a steering angle of the steering and set a first steering angle based on the steering angle to control the first steering driver in accordance with the first steering angle; and a second steering controller configured to acquire the information on the steering angle and set a second steering angle based on the steering angle to control the second steering driver in accordance with the second steering angle. Upon detecting anomaly in the steering of the first wheel pair from the steering angle and the steering detection angle, the first steering controller controls the lock to lock the steering of the first wheel pair. While the steering of the first wheel pair is non-normal, the second steering controller corrects the second steering angle to a second corrected steering angle according to the steering detection angle in a locked state, and controls the second steering driver in accordance with the second corrected steering angle.

Thus, if an anomaly occurs in the first steering driver, the vehicle locks the first wheel pair in non-steerable state, and corrects the second steering angle in accordance with the steering detection angle in the locked state to control the normal steering of the second wheel pair. Thereby, the vehicle can appropriately travel while controlling the second steering driver in normal operation, and can appropriately deal with the anomaly in the steering.

According to the present invention, the first steering controller may set the first steering angle on the basis of first steering-angle information to control the first steering driver, the first steering-angle information serving as information on the first steering angle set in advance. The second steering controller may set the second steering angle on the basis of second steering-angle information to control the second steering driver, the second steering-angle information serving as information on the second steering angle set in advance and differing from the first steering-angle information.

Thus, the vehicle controls the first steering driver and the second steering driver in accordance with the first steering angle and the second steering angle set based on the first steering-angle information and the second steering-angle information different from each other, to be able to individually steer the first wheel pair and the second wheel pair more appropriately.

According to the present invention, the first steering controller may set the first steering angle on the basis of first steering-angle information to control the first steering driver, the first steering-angle information serving as information on the first steering angle set in advance. The second steering controller may set the second steering angle on the basis of the first steering-angle information and a gain of one or less, to control the second steering driver.

Thus, by setting the second steering angle according to the gain, the vehicle can reduce storage capacity required for the information for setting the second steering angle.

According to the present invention, the first wheel steering controller may set the first steering angle on the basis of the first steering-angle information, to control the first steering driver, the first steering-angle information being associated with a speed of the vehicle.

Thereby, the vehicle can appropriately set the first steering angle in accordance with the speed of the vehicle to control the first steering driver.

According to the present invention, the first wheel pair is a front wheel pair, the second wheel pair is a rear wheel pair, and the first steering driver is steerable of the first wheel pair up to a first maximum steering angle. The second steering driver may be steerable of the second wheel pair up to a second maximum steering angle equal to or larger than a half of the first maximum steering angle.

Thereby, the vehicle can appropriately travel by steering the second steering driver in a range above the steering detection angle in the non-normal state of the first steering driver.

According to the present invention, the first wheel pair is a front wheel pair and the second wheel pair is a rear wheel pair. The second steering controller may vary a rate of change in the second steering angle relative to the steering angle in accordance with a degree of the first steering angle.

Thereby, the vehicle can set the second steering angle according to a degree of the first steering angle so as to appropriately set, for example, a turning radius according to the first steering angle while reducing a driver's feeling of strangeness.

According to the present invention, the second steering controller may vary the rate of change in the second steering angle depending on whether the first steering angle is equal to or larger than a maximum steering angle of the first steering driver.

Thereby, the vehicle can reduce a driver's feeling of strangeness in a situation that a turning radius of the vehicle is small and the second wheel pair does not need to be steered much.

According to the present invention, the first steering driver may set the first steering angle within a limit of a half or less of a first maximum steering angle, to steer the first wheel pair, the first maximum steering angle serving as a maximum steering angle at which the first wheel pair is steerable. The second steering driver steers the second wheel pair at the second steering angle of the same degree as the first steering angle.

Thereby, the vehicle can decrease the driving amount and force of the first steering driver or the second steering driver required for the steering to approximately half the driving amount and force of conventional vehicles having the same minimum turning radius, which can reduce the first steering driver or the second steering driver in size and cost.

BRIEF DESCRIPTION OF DRAWINGS

FIG. 3 is a table as an exemplary front-wheel steering angle table;

FIG. 4 is a table as an exemplary rear-wheel steering angle table;

DESCRIPTION OF EMBODIMENTS

Figure 1:
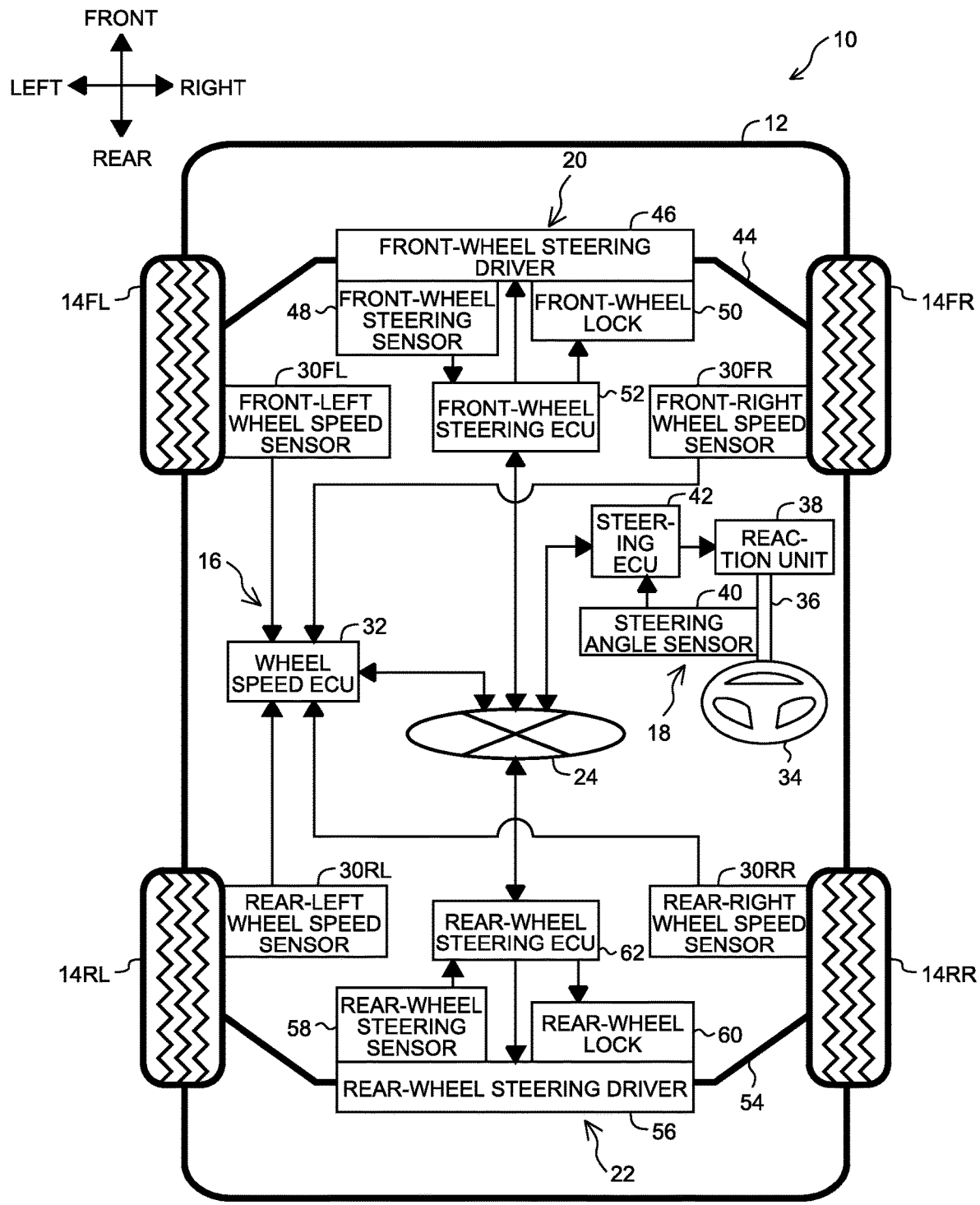
FIG. 1 is a diagram illustrating an overall configuration of a vehicle according to an embodiment.

In the following, exemplary embodiments include same or like elements which will be denoted by common reference numerals, and overlapping descriptions thereof will be avoided as appropriate.

First Embodiment

FIG. 1 is a diagram illustrating an overall configuration of a vehicle 10 according to an embodiment. The vehicle 10 of the embodiment is a four-wheel steering (4WS) vehicle of, for example, a steer-by-wire system, which includes a front-wheel steering mechanism 20 and a rear-wheel steering mechanism 22 to be able to steer four wheels 14 by transmitting and receiving electrical signals to and from the mechanisms 20 and 22 through wired communication (that is, using wires) or wireless communication.

The vehicle 10 of the embodiment may be, for example, an automobile (internal combustion engine automobile) including an internal combustion engine (engine, not illustrated) as a drive source, an automobile (such as an electric vehicle or a fuel cell vehicle) including an electric motor (motor, not illustrated) as a drive source, or an automobile (hybrid vehicle) including both an engine and a motor as a drive source. The vehicle 10 can incorporate various transmissions, and various devices (such as systems and components) required for driving the internal combustion engine and/or the motor. The systems, numbers, and layouts of devices related to the drive source of the vehicle 10 can be variously set.

As illustrated in FIG. 1, the vehicle 10 includes a vehicle body 12, four wheels 14FL, 14FR, 14RL, and 14RR, a wheel-speed detection mechanism 16, a steering mechanism 18, the front-wheel steering mechanism 20, the rear-wheel steering mechanism 22, and an in-vehicle network 24. The wheels 14FL, 14FR, 14RL, and 14RR are referred to as the wheels 14 unless they need to be distinguished from one another. The front wheels 14FL and 14FR are referred to as front wheels 14F unless they need to be distinguished from each other. The rear wheels 14RL and 14RR are referred to as rear wheels 14R unless they need to be distinguished from each other. The front wheel pair 14F and the rear wheel pair 14R are an example of a first wheel pair and a second wheel pair.

The vehicle body 12 defines a vehicle interior in which occupants ride, and which accommodates or supports the wheels 14, the wheel-speed detection mechanism 16, the front-wheel steering mechanism 20, the rear-wheel steering mechanism 22, and the steering mechanism 18.

The wheels 14 include the wheel 14FL, the wheel 14FR, the wheel 14RL, and the wheel 14RR at the front left, at the front right, at the rear left, and at the rear right of the vehicle body 12, respectively. The four wheels 14 are installed on the vehicle body 12 and steerable.

The wheel-speed detection mechanism 16 detects and controls a wheel speed WV of each of the wheels 14 as an exemplary speed of the vehicle 10. The wheel-speed detection mechanism 16 includes a front-left wheel speed sensor 30FL, a front-right wheel speed sensor 30FR, a rear-left wheel speed sensor 30RL, a rear-right wheel speed sensor 30RR, and a wheel-speed electronic control unit (ECU) 32.

The front-left wheel speed sensor 30FL is located near the front-left wheel 14FL. The front-right wheel speed sensor 30FR is located near the front-right wheel 14FR. The rear-left wheel speed sensor 30RL is located near the rear-left wheel 14RL. The rear-right wheel speed sensor 30RR is located near the rear-right wheel 14RR. The wheel speed sensors 30FL, 30FR, 30RL, and 30RR are referred to as a wheel speed sensor 30 unless they need to be distinguished from one another. The wheel speed sensor 30 detects amount of rotation or rotation speed per unit time of each of the wheels 14. The wheel speed sensor 30 includes, for example, a Hall element. The wheel speed sensor 30 outputs, to the wheel speed ECU 32, the number of wheel speed pulses representing the detected rotation speed as a sensor value. The wheel speed sensor 30 may output the sensor value to the in-vehicle network 24.

The wheel speed ECU 32 is in wired or wireless connection to the wheel speed sensors 30 and the in-vehicle network 24 so as to be able to transmit and receive information thereto and therefrom. The wheel speed ECU 32 performs control of the vehicle 10 in accordance with, for example, the sensor values acquired from the wheel speed sensors 30.

The steering mechanism 18 receives a steering instruction from, for example, a driver. The steering mechanism 18 includes a steering 34, a steering shaft 36, a reaction unit 38, a steering angle sensor 40, and a steering ECU 42.

The steering 34 represents a steering wheel or a handle rotatably installed in the vehicle body 12. The steering 34 is rotated by the driver to receive a steering instruction and steer the front wheels 14F and the rear wheels 14R.

The steering shaft 36 holds, at one end, the steering 34. The steering shaft 36 rotates together with the steering 34 rotated by the driver. The steering shaft 36 is mechanically coupled to neither the front-wheel steering mechanism 20 nor the rear-wheel steering mechanism 22.

The reaction unit 38 applies a reaction force to the steering 34 through the steering shaft 36. The reaction unit 38 is, for example, a reaction actuator including, for example, a motor. Along with the driver's turning the steering 34, the reaction unit 38 acquires a reaction instruction from the steering ECU 42 and applies, to the steering 34, torque in a direction opposite to the turning direction as the reaction force.

The steering angle sensor 40 is placed on the steering 34 or the steering shaft 36. The steering angle sensor 40 detects a steering angle $\theta_S$ serving as an amount or angle of rotation of the steering 34. The steering angle sensor 40 is, for example a rotary encoder. The steering angle sensor 40 outputs the detected steering angle $\theta_S$ to the steering ECU 42.

The steering ECU 42 is in wired or wireless connection with the reaction unit 38, the steering angle sensor 40, and the in-vehicle network 24 so as to be able to transmit and receive information thereto and therefrom. The steering ECU 42 processes information on the steering 34 to control the steering mechanism 18.

The front-wheel steering mechanism 20 controls the steering of the front wheels 14F. The front-wheel steering mechanism 20 includes a front-wheel tie rod 44, a front-wheel steering driver 46, a front-wheel steering sensor 48, a front-wheel lock 50, and a front-wheel steering ECU 52.

One end of the front-wheel tie rod 44 is connected to the front-left wheel 14FL. The other end of the front-wheel tie rod 44 is connected to the front-right wheel 14FR. The front-wheel tie rod 44 is moved rightward or leftward by a driving force from the front-wheel steering driver 46 to steer the front wheels 14F.

The front-wheel steering driver 46 is an exemplary first steering driver or second steering driver. The front-wheel steering driver 46 is located in the front-wheel tie rod 44. The front-wheel steering driver 46 includes, for example, an actuator such as a drive motor, a pinion, and a rack. After receiving a front-wheel steering signal from the front-wheel steering ECU 52, the front-wheel steering driver 46 drives the drive motor to rotate the pinion to drive the rack rightward or leftward with a rotational force of the pinion, and thereby drives the front-wheel tie rod 44 rightward or leftward. Through this operation, the front-wheel steering driver 46 steers the front wheel pair 14F. The front-wheel steering driver 46 is configured to be able to steer the front wheels 14F up to a maximum steering angle $\theta_{Fmax}$. The maximum front-wheel steering angle $\theta_{Fmax}$ is an exemplary first maximum steering angle.

The front-wheel steering sensor 48 is an exemplary detector. The front-wheel steering sensor 48 detects a front-wheel steering detection angle $\theta_{FD}$ being an actual steering angle of the front wheels. The front-wheel steering sensor 48 is, for example, a rotary encoder for detecting the amount of rotation of the drive motor of the front-wheel steering driver 46. The front-wheel steering sensor 48 outputs the amount of rotation of the drive motor as the front-wheel steering detection angle $\theta_{FD}$ to the front-wheel steering ECU 52.

The front-wheel lock 50 locks the front wheels 14F in a non-steerable state. The front-wheel lock 50 includes, for example, a trapezoidal thread. The front-wheel lock 50 locks the front wheels 14F in accordance with a front-wheel lock signal from the front-wheel steering ECU 52.

The front-wheel steering ECU 52 is in wired or wireless connection with the front-wheel steering driver 46, the front-wheel steering sensor 48, the front-wheel lock 50, and the in-vehicle network 24 so as to be able to transmit and receive information thereto and therefrom. The front-wheel steering ECU 52 controls the front-wheel steering mechanism 20.

The rear-wheel steering mechanism 22 controls the steering of the rear wheels 14R. The rear-wheel steering mechanism 22 includes a rear-wheel tie rod 54, a rear-wheel steering driver 56, a rear-wheel steering sensor 58, a rear-wheel lock 60, and a rear-wheel steering ECU 62.

One end of the rear-wheel tie rod 54 is connected to the rear-left wheel 14RL. The other end of the rear-wheel tie rod 54 is connected to the rear-right wheel 14RR. The rear-wheel tie rod 54 is moved rightward or leftward by a driving force from the rear-wheel steering driver 56 to steer the rear wheels 14R.

The rear-wheel steering driver 56 is one example of a first steering driver or a second steering driver. The rear-wheel steering driver 56 is placed in the rear-wheel tie rod 54. The rear-wheel steering driver 56 includes, for example, an actuator such as a drive motor, a pinion, and a rack. After receiving a rear-wheel steering signal from the rear-wheel steering ECU 62, the rear-wheel steering driver 56 drives the drive motor to rotate the pinion to move the rack rightward or leftward by the rotational force of the pinion, and thereby drives the rear-wheel tie rod 54 rightward or leftward. Through this operation, the rear-wheel steering driver 56 steers the rear wheel pair 14R. The rear-wheel steering driver 56 is configured to be able to steer the rear wheels 14R up to a maximum rear-wheel steering angle $\theta_{Rmax}$. The maximum rear-wheel steering angle $\theta_{Rmax}$ is an exemplary second maximum steering angle. In the present embodiment, the maximum rear-wheel steering angle $\theta_{Rmax}$ is equal to the maximum front-wheel steering angle $\theta_{Fmax}$. For example, $\theta_{Fmax}=\theta_{Rmax}=15$ degrees holds.

The rear-wheel steering sensor 58 detects a rear-wheel steering detection angle $\theta_{RD}$ being an actual steering angle of the rear wheels 14R. The rear-wheel steering sensor 58 is, for example, a rotary encoder for detecting the amount of rotation of the drive motor of the rear-wheel steering driver 56. The rear-wheel steering sensor 58 outputs the amount of rotation of the drive motor, as the rear-wheel steering detection angle $\theta_{RD}$, to the rear-wheel steering ECU 62.

The rear-wheel lock 60 locks the rear wheels 14R in a non-steerable state. The rear-wheel lock 60 includes, for example, a trapezoidal thread. The rear-wheel lock 60 locks the rear wheels 14R in accordance with a rear-wheel lock signal from the rear-wheel steering ECU 62.

The rear-wheel steering ECU 62 is in wired or wireless connection with the rear-wheel steering driver 56, the rear-wheel steering sensor 58, the rear-wheel lock 60, and the in-vehicle network 24 so as to be able to transmit and receive information thereto and therefrom. The rear-wheel steering ECU 62 controls the rear-wheel steering mechanism 22.

The in-vehicle network 24 is, for example, a controller area network (CAN). The in-vehicle network 24 electrically connects, in a wired or wireless manner, the wheel speed ECU 32, the steering ECU 42, the front-wheel steering ECU 52, and the rear-wheel steering ECU 62 to one another so as to be able to transmit and receive information thereamong.

Figure 2:
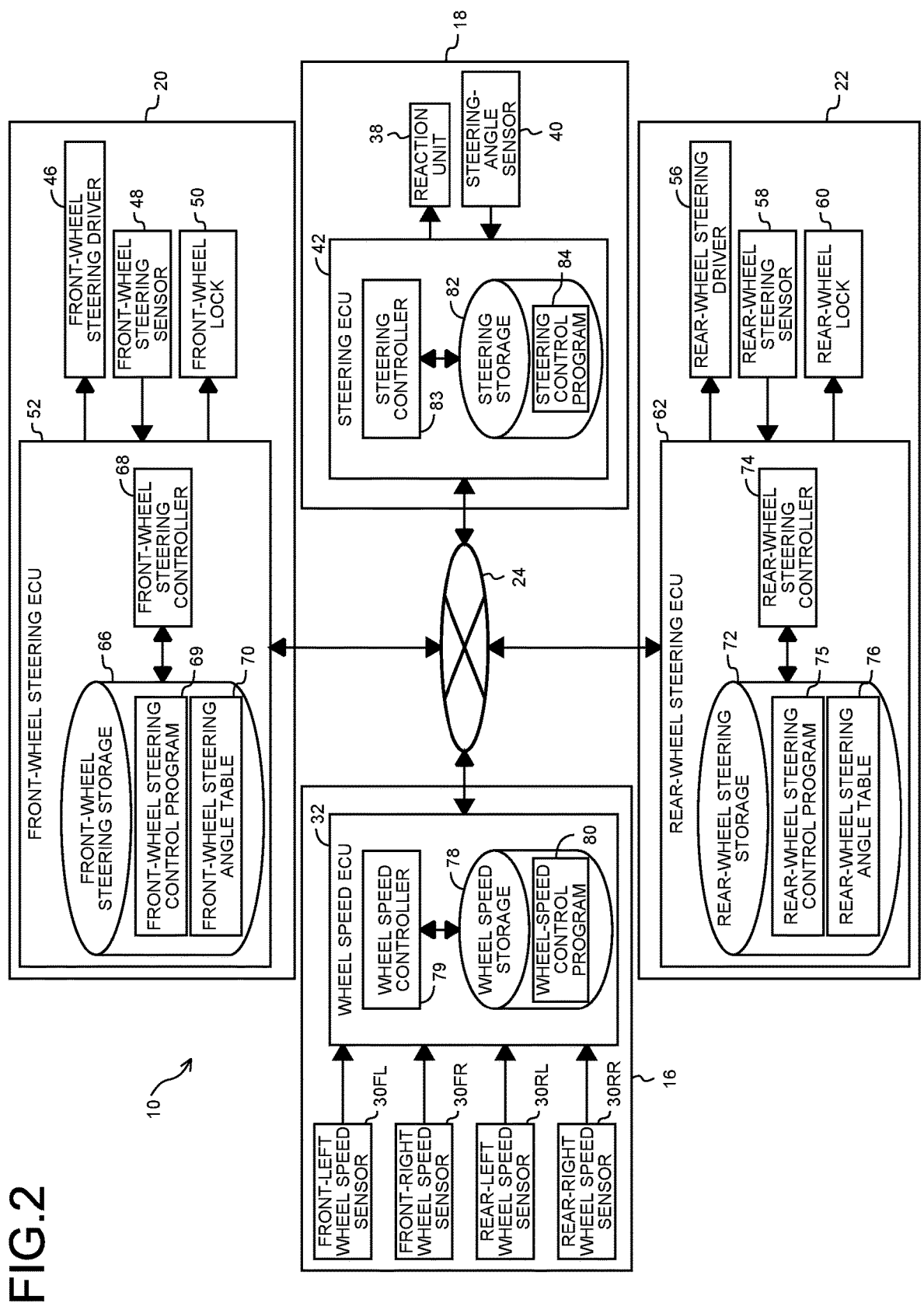
FIG. 2 is a block diagram illustrating a control system of the vehicle.

FIG. 2 is a block diagram illustrating a control system of the vehicle 10.

The front-wheel steering ECU 52 is, for example, a computer. The front-wheel steering ECU 52 includes a front-wheel steering storage 66 and a front-wheel steering controller 68.

The front-wheel steering storage 66 is, for example, a storage device, such as a read-only memory (ROM), a random access memory (RAM), a hard disk drive (HDD), and a solid-state drive (SSD). The front-wheel steering storage 66 stores a computer program executed by the front-wheel steering controller 68, information used in the execution of the computer program by the front-wheel steering controller 68, and information which the front-wheel steering controller 68 generates through the execution of the computer program. The front-wheel steering controller 68 executes a front-wheel steering control program 69 for controlling the front-wheel steering mechanism 20, as an example of the computer program. The front-wheel steering controller 68 uses a front-wheel steering angle table 70, as an example of the information, in executing the front-wheel steering control program 69. The front-wheel steering angle table 70 is exemplary first steering-angle information. The front-wheel steering angle table 70 includes front-wheel steering angles $\theta_F$ set in advance in association with steering angles $\theta_S$ and wheel speeds WV.

The front-wheel steering controller 68 is an exemplary first steering controller or second steering controller. The front-wheel steering controller 68 is, for example, a hardware processor such as a central processing unit (CPU). The front-wheel steering controller 68 reads the front-wheel steering control program 69 from the front-wheel steering storage 66, to control the front-wheel steering mechanism 20. Specifically, the front-wheel steering controller 68 acquires information on the wheel speed WV and the steering angle $\theta_S$ of the steering 34 from the in-vehicle network 24. The front-wheel steering controller 68 sets the front-wheel steering angle $\theta_F$ with reference to the front-wheel steering angle table 70, the wheel speed WV, and the steering angle $\theta_S$. The front-wheel steering controller 68 outputs the front-wheel steering signal representing the set front-wheel steering angle $\theta_F$ to control the front-wheel steering driver 46 to steer the front wheels 14F. The front-wheel steering controller 68 also acquires the front-wheel steering detection angle $\theta_{FD}$ from the front-wheel steering sensor 48. The front-wheel steering controller 68 detects an anomaly in the steering of the front wheels 14F from the steering angle $\theta_S$ and the front-wheel steering detection angle $\theta_{FD}$. After anomaly detection, the front-wheel steering controller 68 outputs the front-wheel lock signal to control the front-wheel lock 50 to lock the steering of the front wheels 14F. If the steering of the rear wheels 14R is non-normal, the front-wheel steering controller 68 acquires a rear-wheel steering detection angle $\theta_{RD}$ in a locked state from the in-vehicle network 24. The front-wheel steering controller 68 corrects the front-wheel steering angle $\theta_F$ to a front-wheel steering angle $\theta_{FA}$ in accordance with the rear-wheel steering detection angle $\theta_{RD}$ in a locked state to control the front-wheel steering driver 46 with the corrected front-wheel steering angle $\theta_{FA}$. Specifically, the front-wheel steering controller 68 sets the sum of the rear-wheel steering detection angle $\theta_{RD}$ in a locked state and the front-wheel steering angle $\theta_F$ as the corrected front-wheel steering angle $\theta_{FA}$.

The rear-wheel steering ECU 62 is, for example, a computer. The rear-wheel steering ECU 62 includes a rear-wheel steering storage 72 and a rear-wheel steering controller 74.

The rear-wheel steering storage 72 is, for example, a storage device, such as a ROM, a RAM, an HDD, and an SSD. The rear-wheel steering storage 72 stores a computer program executed by the rear-wheel steering controller 74, information used in the execution of the computer program by the rear-wheel steering controller 74, and information which the rear-wheel steering controller 74 generates through the execution of the computer program. The rear-wheel steering controller 74 executes a rear-wheel steering control program 75 for controlling the rear-wheel steering mechanism 22, as an example of the computer program. The rear-wheel steering controller 74 uses a rear-wheel steering angle table 76, as an example of the information, in executing the rear-wheel steering control program 75. The rear-wheel steering angle table 76 is exemplary second steering-angle information. The rear-wheel steering angle table 76 contains rear-wheel steering angles $\theta_R$ set in advance in association with steering angles $\theta_S$ and wheel speeds WV. The rear-wheel steering angle table 76 at least partially differs from the front-wheel steering angle table 70.

The rear-wheel steering controller 74 is an exemplary first steering controller or second steering controller. The rear-wheel steering controller 74 is, for example, a hardware processor such as a central processing unit (CPU). The rear-wheel steering controller 74 reads the rear-wheel steering control program 75 from the rear-wheel steering storage 72, to control the rear-wheel steering mechanism 22. Specifically, the rear-wheel steering controller 74 acquires the information on the wheel speed WV and the steering angle $\theta_S$ of the steering 34 from the in-vehicle network 24. The rear-wheel steering controller 74 sets the rear-wheel steering angle $\theta_R$ with reference to the rear-wheel steering angle table 76, the wheel speed WV, and the steering angle $\theta_S$. The rear-wheel steering controller 74 outputs the rear-wheel steering signal representing the set rear-wheel steering angle $\theta_R$ to control the rear-wheel steering driver 56 to steer the rear wheels 14R. The rear-wheel steering controller 74 also acquires a rear-wheel steering detection angle $\theta_{RD}$ from the rear-wheel steering sensor 58. The rear-wheel steering controller 74 detects an anomaly in the steering of the rear wheels 14R from the steering angle $\theta_S$ and the rear-wheel steering detection angle $\theta_{RD}$. After the anomaly detection, the rear-wheel steering controller 74 outputs the rear-wheel lock signal to control the rear-wheel lock 60 to lock the steering of the rear wheels 14R. If the steering of the front wheels 14F is non-normal, the rear-wheel steering controller 74 acquires the front-wheel steering detection angle $\theta_{FD}$ in a locked state from the in-vehicle network 24. The rear-wheel steering controller 74 corrects the rear-wheel steering angle $\theta_R$ to a rear-wheel steering angle $\theta_{RA}$ in accordance with the front-wheel steering detection angle $\theta_{FD}$ in a locked state to control the rear-wheel steering driver 56 with the corrected steering angle $\theta_{RA}$. Specifically, the rear-wheel steering controller 74 sets the sum of the front-wheel steering detection angle $\theta_{FD}$ in a locked state and the rear-wheel steering angle $\theta_R$ as the corrected rear-wheel steering angle $\theta_{RA}$. The corrected rear-wheel steering angle $\theta_{RA}$ is an exemplary second corrected steering angle.

The wheel speed ECU 32 is, for example, a computer. The wheel speed ECU 32 includes a wheel speed storage 78 and a wheel speed controller 79. The wheel speed storage 78 is, for example, a storage device, such as a ROM, a RAM, an HDD, and an SSD. The wheel speed controller 79 is, for example, a hardware processor such as a CPU. By a wheel speed control program 80 stored in the wheel speed storage 78, the wheel speed controller 79 calculates the wheel speed WV from, for example, the average value of four sensor values acquired from the four-wheel speed sensors 30, to control brakes mounted at the wheels 14 and output the wheel speed WV to the in-vehicle network 24.

The steering ECU 42 is, for example, a computer. The steering ECU 42 includes a steering storage 82, and a steering controller 83. The steering storage 82 is, for example, a storage device, such as a ROM, a RAM, an HDD, and an SSD. The steering controller 83 is, for example, a hardware processor such as a CPU. By a steering control program 84 stored in the steering storage 82, the steering controller 83 controls the magnitude and direction of the reaction force of the reaction unit 38 in accordance with the steering angle $\theta_S$ acquired from the steering angle sensor 40, and outputs the steering angle $\theta_S$ to the in-vehicle network 24.

FIG. 3 is a table as an example of the front-wheel steering angle table 70. As illustrated in FIG. 3, the front-wheel steering angle table 70 lists the steering angles $\theta_{Sn}$ and the front-wheel steering angles $\theta_F$ in association with each other. The front-wheel steering angle $\theta_F$ includes a low-speed front-wheel steering angle $\theta_{FLn}$, a medium-speed front-wheel steering angle $\theta_{FMn}$, and a high-speed front-wheel steering angle $\theta_{FHn}$ where n=1, 2, 3, ..., N.

The low-speed front-wheel steering angle $\theta_{FLn}$ represents the front-wheel steering angle $\theta_F$ at the wheel speed WV being a first speed VL (for example, the speed of the vehicle 10 being 0 km/h). The medium-speed front-wheel steering angle $\theta_{FMn}$ represents the front-wheel steering angle $\theta_F$ at the wheel speed WV being a second speed VM (for example, the speed of the vehicle 10 being 50 km/h). The second speed VM is higher than the first speed VL. The high-speed front-wheel steering angle $\theta_{FHn}$ represents the front-wheel steering angle $\theta_F$ at the wheel speed WV being a third speed VH (for example, the speed of the vehicle 10 being 100 km/h). The third speed VH is higher than the second speed VM.

The front-wheel steering controller 68 sets the front-wheel steering angle $\theta_F$ according to the wheel speed WV and the steering angle $\theta_S$. For example, when the wheel speed WV is in a range including the first speed VL, the second speed VM, and the third speed VH, the front-wheel steering controller 68 calculates and sets the front-wheel steering angle $\theta_F$ by linear interpolation. In linear interpolation, the front-wheel steering controller 68 calculates the front-wheel steering angle $\theta_F$ by Expression (1) or (2) below. Specifically, the front-wheel steering controller 68 extracts the low-speed front-wheel steering angle $\theta_{FLn}$, the medium-speed front-wheel steering angle $\theta_{FMn}$, and the high-speed front-wheel steering angle $\theta_{FHn}$ associated with the steering angle $\theta_S$, from the front-wheel steering angle table 70. The front-wheel steering controller 68 substitutes the extracted steering angles $\theta_{FLn}$, $\theta_{FMn}$, and $\theta_{FHn}$ into Expression (1) or (2) depending on the wheel speed WV, to calculate the front-wheel steering angle $\theta_F$.

$$\theta_F = \frac{\theta_{FMn} - \theta_{FLn}}{VM - VL} WV + \frac{\theta_{FLn} \cdot VM - \theta_{FMn} \cdot VL}{VM - VL} \quad (1)$$
(when $WV < VM$)

$$\theta_F = \frac{\theta_{FHn} - \theta_{FMn}}{VH - VM} WV + \frac{\theta_{FMn} \cdot VH - \theta_{FHn} \cdot VM}{VH - VM} \quad (2)$$
(when $WV \geq VM$)

FIG. 4 is a table as an example of the rear-wheel steering angle table 76. As illustrated in FIG. 4, the rear-wheel steering angle table 76 lists the steering angles $\theta_{Sn}$ and the rear-wheel steering angles $\theta_R$ in association with each other. The rear-wheel steering angle $\theta_R$ includes a low-speed rear-wheel steering angle $\theta_{RLn}$, a medium-speed rear-wheel steering angle $\theta_{RMn}$, and a high-speed rear-wheel steering angle $\theta_{RHn}$ where n=1, 2, 3, ..., N.

The low-speed rear-wheel steering angle $\theta_{RLn}$, the medium-speed rear-wheel steering angle $\theta_{RMn}$, and the high-speed rear-wheel steering angle $\theta_{RHn}$ correspond to the first speed VL, the second speed VM, and the third speed VH of the wheel speed WV, respectively.

The rear-wheel steering controller 74 sets the rear-wheel steering angle $\theta_R$ according to the wheel speed WV and the steering angle $\theta_S$. For example, when the wheel speed WV is in a range including the first speed VL, the second speed VM, and the third speed VH, the rear-wheel steering controller 74 calculates and sets the rear-wheel steering angle $\theta_R$ by linear interpolation. In linear interpolation, the rear-wheel steering controller 74 calculates the rear-wheel steering angle $\theta_R$ by Expression (3) or (4) below. Specifically, the rear-wheel steering controller 74 extracts the low-speed rear-wheel steering angle $\theta_{RLn}$, the medium-speed rear-wheel steering angle $\theta_{RMn}$, and the high-speed rear-wheel steering angle $\theta_{RHn}$ associated with the steering angle $\theta_S$, from the rear-wheel steering angle table 76. The rear-wheel steering controller 74 substitutes the extracted steering angles $\theta_{RLn}$, $\theta_{RMn}$, and $\theta_{RHn}$ into Expression (3) or (4) depending on the wheel speed WV, to calculate the rear-wheel steering angle $\theta_R$.

$$\theta_R = \frac{\theta_{RMn} - \theta_{RLn}}{VM - VL} WV + \frac{\theta_{RLn} \cdot VM - \theta_{RMn} \cdot VL}{VM - VL} \quad (3)$$
(when $WV < VM$)

$$\theta_R = \frac{\theta_{RHn} - \theta_{RMn}}{VH - VM} WV + \frac{\theta_{RMn} \cdot VH - \theta_{RHn} \cdot VM}{VH - VM} \quad (4)$$
(when $WV \geq VM$)

Figure 5:
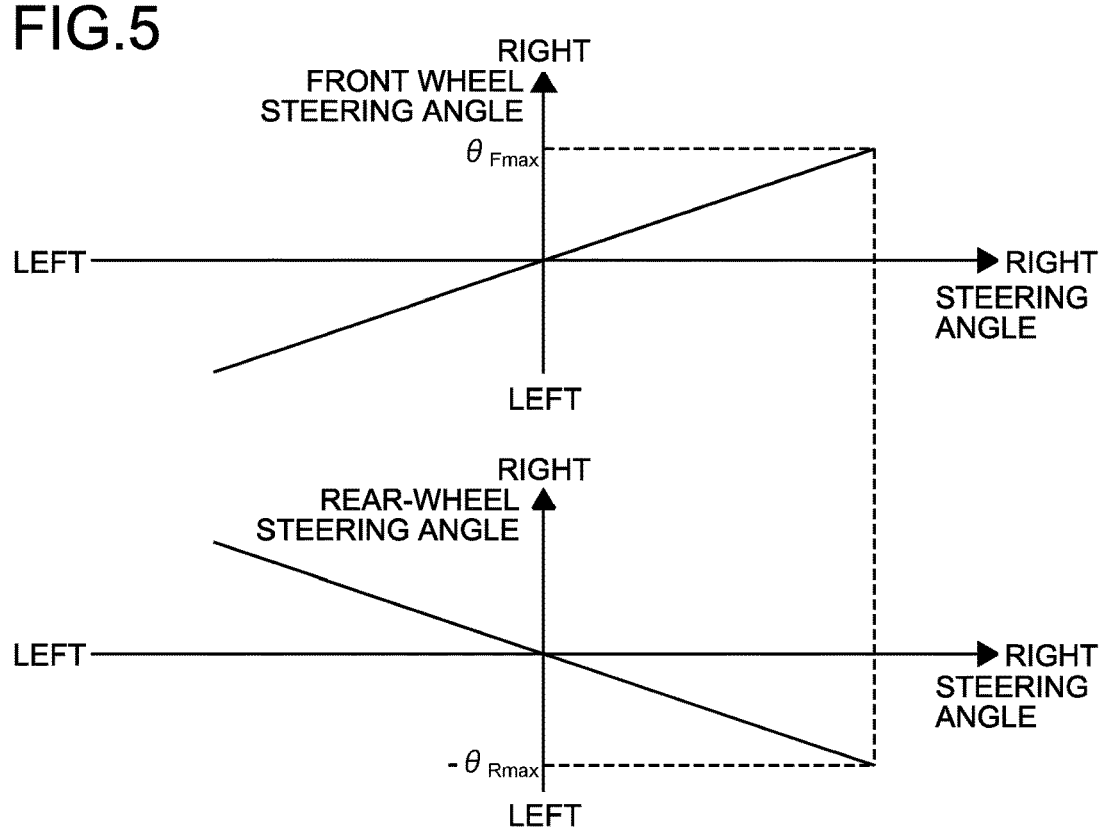
FIG. 5 illustrates graphs representing relations between a steering angle, and a front-wheel steering angle and a rear-wheel steering angle in a normal state while the wheel speed is a low speed lower than a speed threshold.
Figure 6:
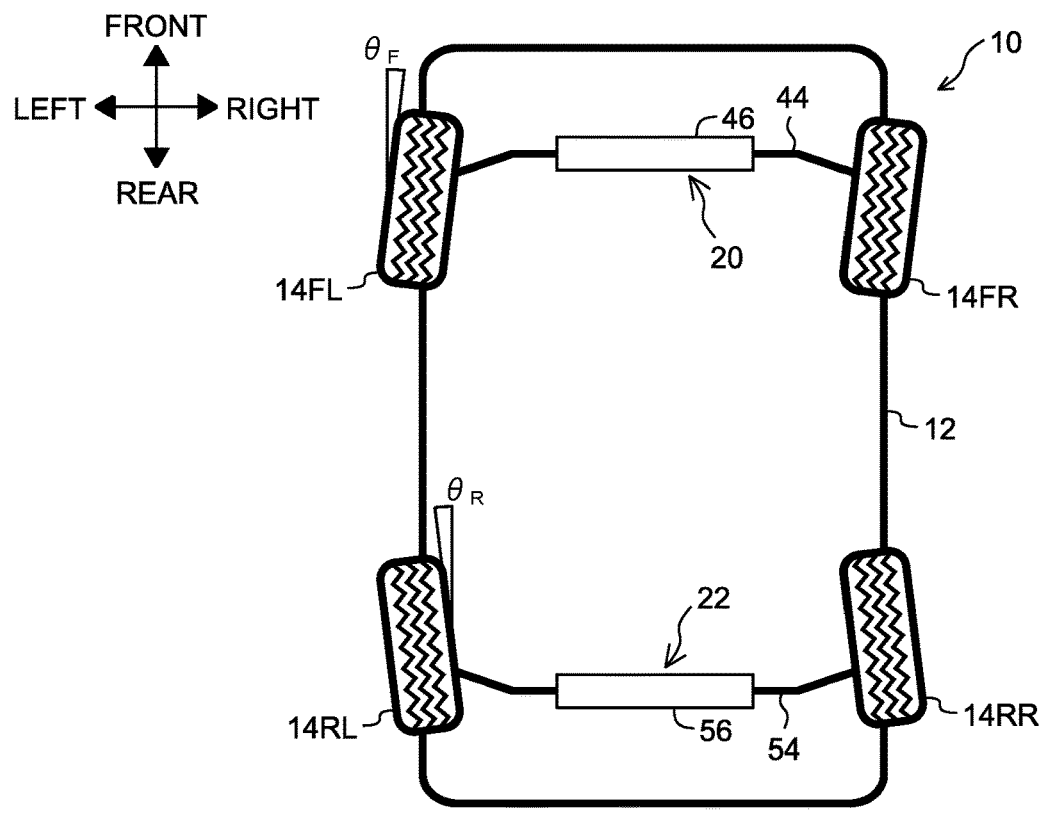
FIG. 6 is a plan view illustrating directions of the wheels in the normal state while the wheel speed is lower than the speed threshold.

FIG. 5 illustrates graphs representing relations between the steering angle $\theta_S$, and the front-wheel steering angle $\theta_F$ and the rear-wheel steering angle $\theta_R$ in a normal state while the wheel speed WV is a low speed lower than a speed threshold. FIG. 6 is a plan view illustrating directions of the wheels 14 in a normal state while the wheel speed WV is lower than the speed threshold. The upper graph of FIG. 5 illustrates a relation between the front-wheel steering angle $\theta_F$ represented by the vertical axis and the steering angle $\theta_S$ represented by the horizontal axis. The lower graph of FIG. 5 illustrates a relation between the rear-wheel steering angle $\theta_R$ represented by the vertical axis and the steering angle $\theta_S$ represented by the horizontal axis. In the vertical axis, upward direction (that is, positive direction) represents rightward steering direction, and downward direction (that is, negative direction) represents leftward steering direction. In the horizontal axis, rightward direction (that is, positive direction) represents rightward steering direction, and leftward direction (that is, negative direction) represents leftward steering direction. Normal state refers to a normal operating state of the front-wheel steering mechanism 20 and the rear-wheel steering mechanism 22 with no anomaly. The speed threshold is set in advance to, for example, 50 km/h.

At the wheel speed WV being lower than the speed threshold in the normal state, the front-wheel steering controller 68 and the rear-wheel steering controller 74 control the front-wheel steering angle $\theta_F$ and the rear-wheel steering angle $\theta_R$ in accordance with the wheel speed WV, the steering angle $\theta_S$, the front-wheel steering angle table 70, and the rear-wheel steering angle table 76, as illustrated in FIGS. 5 and 6. Specifically, the front-wheel steering controller 68 and the rear-wheel steering controller 74 control the front-wheel steering angle $\theta_F$ and the rear-wheel steering angle $\theta_R$ in opposite phase at the same degree.

Figure 7:
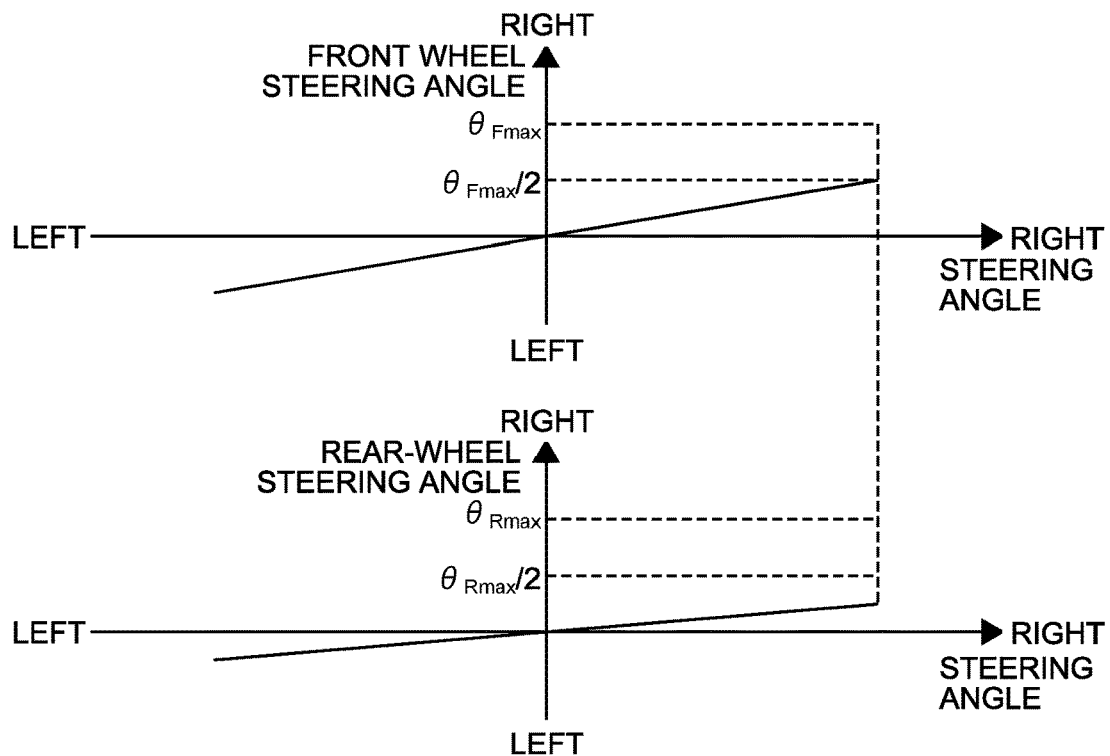
FIG. 7 is graphs representing the relations between the steering angle, and the front-wheel steering angle and the rear-wheel steering angle in the normal state while the wheel speed is a high speed equal to or higher than the speed threshold.
Figure 8:
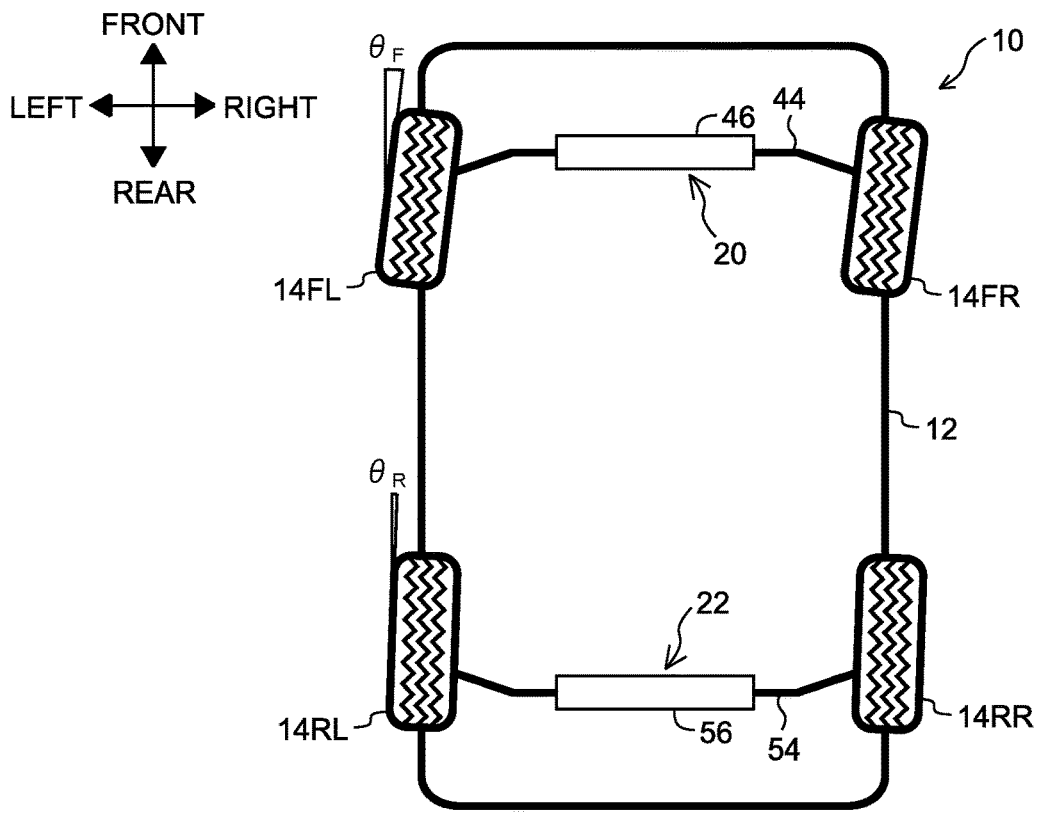
FIG. 8 is a plan view illustrating the directions of the wheels in the normal state while the wheel speed is equal to or higher than the speed threshold.

FIG. 7 is graphs representing the relations between the steering angle $\theta_S$, and the front-wheel steering angle $\theta_F$ and the rear-wheel steering angle $\theta_R$ in the normal state when the wheel speed WV is a high speed equal to or higher than the speed threshold. FIG. 8 is a plan view illustrating the directions of the wheels 14 in the normal state when the wheel speed WV is equal to or higher than the speed threshold. The vertical axes and the horizontal axes of FIG. 7 are the same as those of FIG. 5.

At the wheel speed WV being equal to or higher than the speed threshold in the normal state, the front-wheel steering controller 68 and the rear-wheel steering controller 74 control the front-wheel steering angle $\theta_F$ and the rear-wheel steering angle $\theta_R$ in accordance with the wheel speed WV, the steering angle $\theta_S$, the front-wheel steering angle table 70, and the rear-wheel steering angle table 76, as illustrated in FIGS. 7 and 8. Specifically, as illustrated in FIG. 8, the front-wheel steering controller 68 and the rear-wheel steering controller 74 control the front-wheel steering angle $\theta_F$ and the rear-wheel steering angle $\theta_R$ in the same phase at a smaller rear-wheel steering angle $\theta_R$ than the front-wheel steering angle $\theta_F$.

Figure 9:
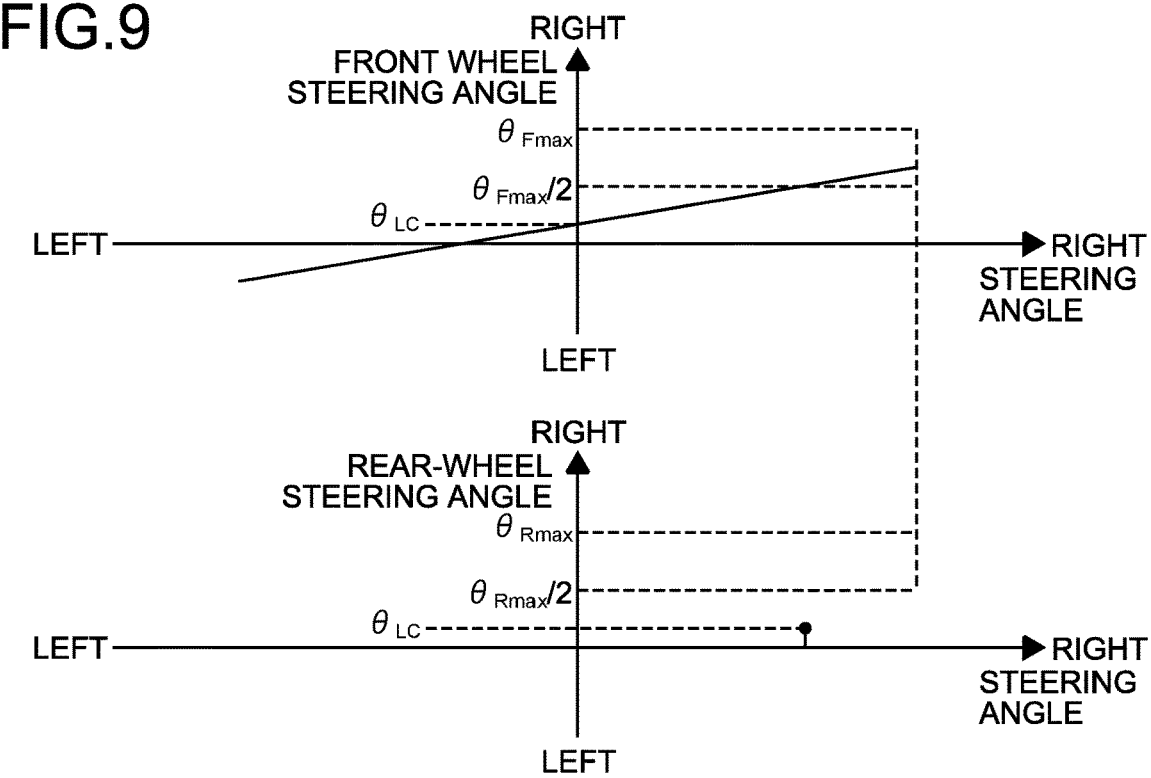
FIG. 9 is graphs representing the relations between the steering angle, and the front-wheel steering angle and the rear-wheel steering angle while the steering of the wheels is placed in a non-normal state.

FIG. 9 illustrates graphs representing the relations between the steering angle $\theta_S$, and the front-wheel steering angle $\theta_F$ and the rear-wheel steering angle $\theta_R$ while the steering of the wheels 14 is placed in a non-normal state. The graphs of FIG. 9 depict the non-normal state of the steering of the rear wheels 14R. The vertical axes and the horizontal axes of FIG. 9 are the same as those of FIG. 5.

Assume that the steering of the rear wheels 14R be non-normal and the rear wheels 14R be locked at a rear-wheel steering angle $\theta_{LC}$, as illustrated in FIG. 9. The front-wheel steering controller 68 may set the rear-wheel steering angle $\theta_{LC}$ to the rear-wheel steering detection angle $\theta_{RD}$ acquired from the in-vehicle network 24 in the lock state of the rear wheels 14R. In this case, the front-wheel steering controller 68 sets the rear-wheel steering angle $\theta_{LC}$ as a front-steering offset value. The front-wheel steering controller 68 corrects the front-wheel steering angle $\theta_F$, set based on the wheel speed WV, the steering angle $\theta_S$, and the front-wheel steering angle table 70, by the front-steering offset value. Specifically, the front-wheel steering controller 68 calculates the sum of the set front-wheel steering angle $\theta_F$ and the rear-wheel steering angle $\theta_{LC}$ being the front-steering offset value, as a corrected front-wheel steering angle $\theta_{FA}$.

Figure 10:
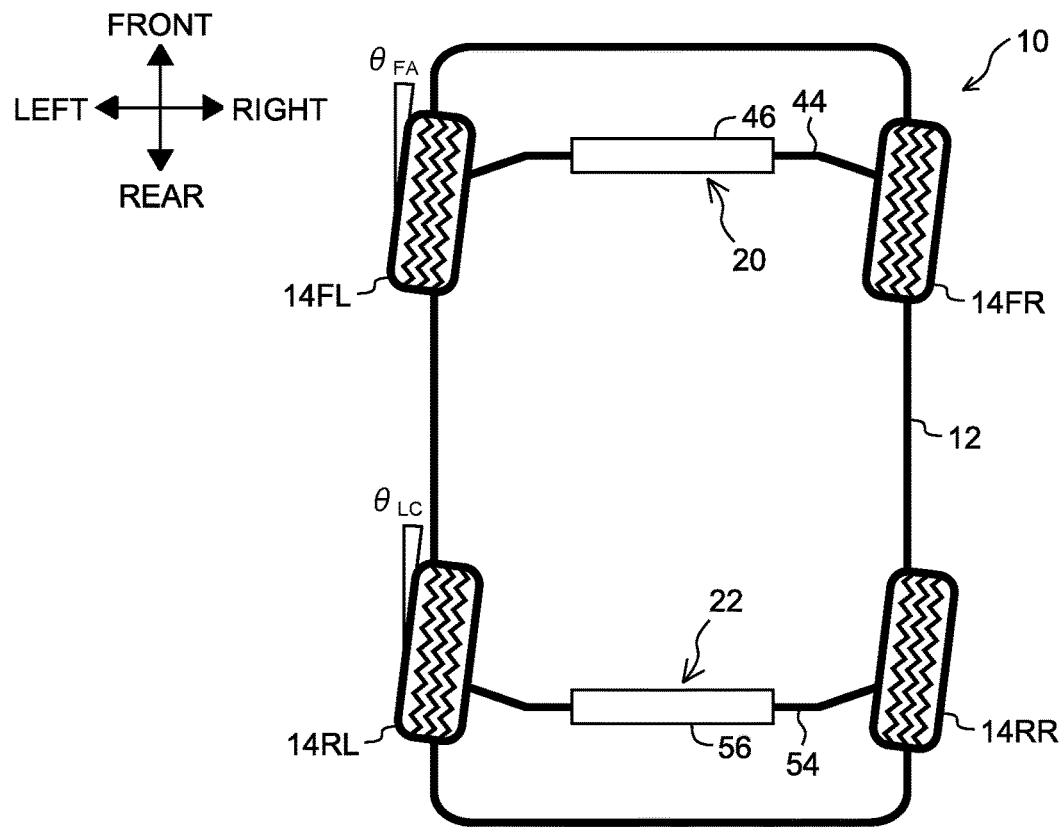
FIG. 10 is a plan view illustrating the directions of the wheels in the non-normal state.

FIG. 10 is a plan view illustrating the directions of the wheels 14 in the non-normal state. FIG. 10 illustrates a state of the steering 34 at the steering angle $\theta_S$ of 0 degree, that is, in a neutral position.

As illustrated in FIG. 10, at the steering angle $\theta_S$ being in the neutral position, the front-wheel steering angle $\theta_F$ coincides with the rear-wheel steering angle $\theta_{LC}$ of the locked rear wheels 14R. Thus, the front wheels 14F are parallel to the rear wheels 14R, and the vehicle 10 travels straight with the vehicle body 12 being inclined. In response to the driver's turning the steering 34 from this state, the front-wheel steering controller 68 sets the front-wheel steering angle $\theta_F$ according to the steering angle $\theta_S$ and the wheel speed WV from the front-wheel steering angle table 70 to further turn the front wheels by the steering angle $\theta_F$ from the state illustrated in FIG. 10. Thereby, the corrected front-wheel steering angle $\theta_{FA}$ will be the sum of the front-wheel steering angle $\theta_F$ set from the front-wheel steering angle table 70 and the front-steering offset value (that is, the rear-wheel steering angle $\theta_{LC}$ in the locked state).

Likewise, with occurrence of anomaly in the steering of the front wheels 14F, the rear-wheel steering controller 74 calculates the corrected rear-wheel steering angle $\theta_{RA}$ to control the steering of the rear wheels 14R. Specifically, the rear-wheel steering controller 74 calculates, as the corrected rear-wheel steering angle $\theta_{RA}$, the sum of the rear-wheel steering angle $\theta_R$, set based on the steering angle $\theta_S$, the wheel speed WV, and the rear-wheel steering angle table 76, and a rear-steering offset value being the front-wheel steering detection angle $\theta_{FD}$ of the locked front wheels 14F in the non-normal state, to control the steering of the rear wheels 14R.

Figure 11:
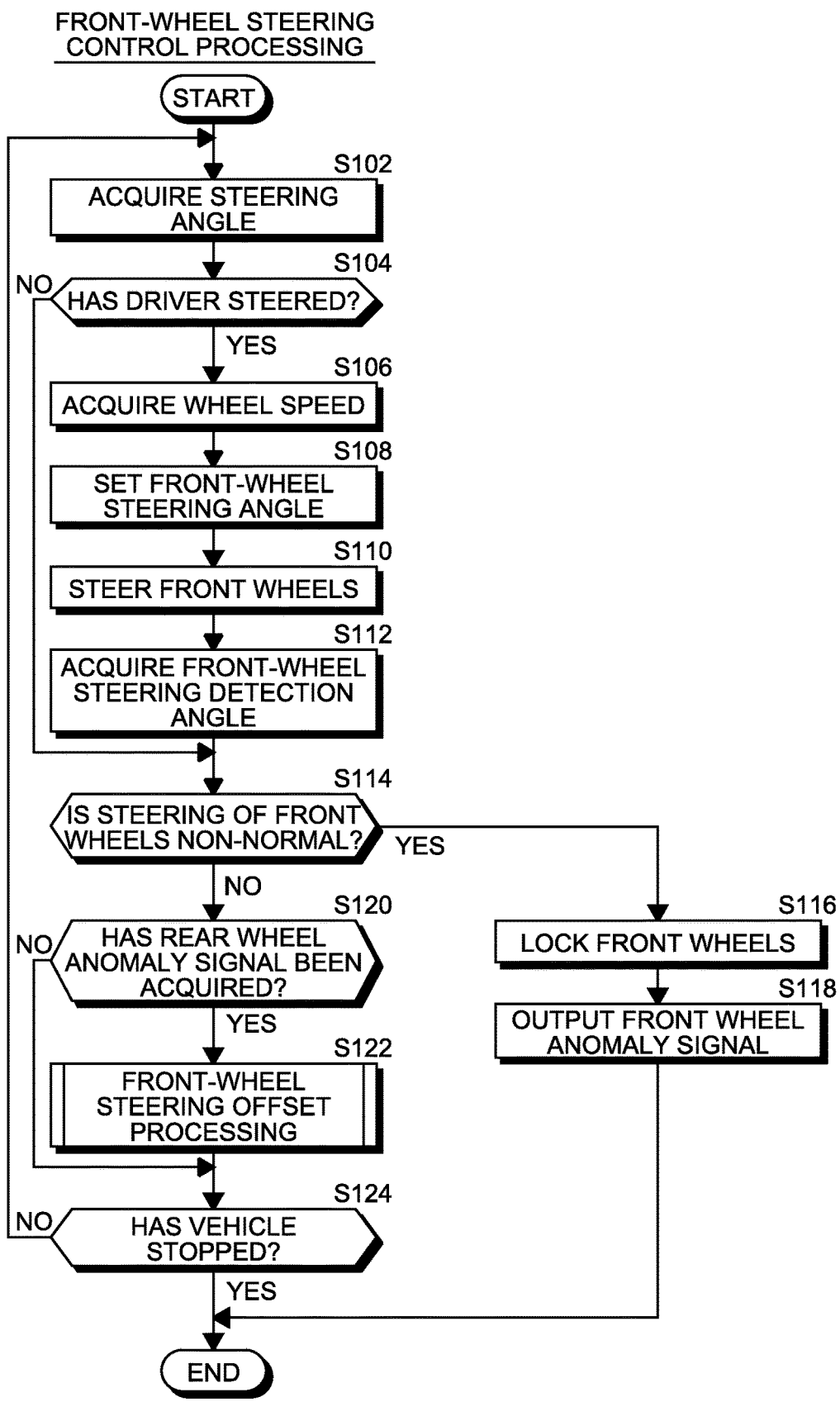
FIG. 11 is a flowchart of front-wheel steering control processing performed by a front-wheel steering controller.

FIG. 11 is a flowchart of front-wheel steering control processing performed by the front-wheel steering controller 68. The front-wheel steering controller 68 performs the front-wheel steering control processing by reading the front-wheel steering control program 69 during startup of the vehicle 10.

In the front-wheel steering control processing, as illustrated in FIG. 11, the front-wheel steering controller 68 acquires the steering angle $\theta_S$ output by the steering controller 83, from the in-vehicle network 24 (S102). The front-wheel steering controller 68 determines from the acquired steering angle $\theta_S$ whether the driver has steered the steering 34 (S104). For example, the front-wheel steering controller 68 may determine that the driver has steered if the currently acquired steering angle $\theta_S$ varies from the previously acquired steering angle $\theta_S$. Alternatively, the front-wheel steering controller 68 may determine that the driver has steered if a change from the previously acquired steering angle $\theta_S$ to the currently acquired steering angle $\theta_S$ is equal to or greater than a preset steering threshold. After determining that the driver has not steered the steering 34 (No at S104), the front-wheel steering controller 68 performs operations at Step S114 and subsequent steps, as described later.

After determining that the driver has steered the steering 34 (Yes at S104), the front-wheel steering controller 68 acquires the wheel speed WV of each of the wheels 14 output by the wheel speed controller 79 from the in-vehicle network 24 (S106). The front-wheel steering controller 68 sets the front-wheel steering angle $\theta_F$ in accordance with the steering angle $\theta_S$ and the wheel speed WV (S108). Specifically, the front-wheel steering controller 68 extracts any of the low-speed front-wheel steering angle $\theta_{FLn}$, the medium-speed front-wheel steering angle $\theta_{FMn}$, and the high-speed front-wheel steering angle $\theta_{FHn}$ corresponding to the steering angle $\theta_S$ and the wheel speed WV from the front-wheel steering angle table 70. The front-wheel steering controller 68 calculates and sets the front-wheel steering angle $\theta_F$ through, for example, linear interpolation of any of the extracted low-speed front-wheel steering angle $\theta_{FLn}$, medium-speed front-wheel steering angle $\theta_{FMn}$, and high-speed front-wheel steering angle $\theta_{FHn}$. The front-wheel steering controller 68 outputs a front-wheel steering signal based on the set front-wheel steering angle $\theta_F$ to control the front-wheel steering driver 46 to steer the front wheels 14F at the front-wheel steering angle $\theta_F$ (S110).

The front-wheel steering controller 68 acquires the front-wheel steering detection angle $\theta_{FD}$ from the front-wheel steering sensor 48 (S112). The front-wheel steering controller 68 determines from the front-wheel steering detection angle $\theta_{FD}$ and the front-wheel steering angle $\theta_F$ whether the steering of the front wheels 14F is non-normal (S114). For example, the front-wheel steering controller 68 may determine that the steering of the front wheels 14F is non-normal if an error between the front-wheel steering detection angle $\theta_{FD}$ of the front wheels 14F and the set front-wheel steering angle $\theta_F$ is equal to or greater than a preset anomaly determination threshold. In contrast, if the error is smaller than the anomaly determination threshold, the front-wheel steering controller 68 may determine that the steering of the front wheels 14F is normal.

After determining that the steering of the front wheels 14F is non-normal (Yes at S114), the front-wheel steering controller 68 outputs a front-wheel lock signal to control the front-wheel lock 50 to lock the front wheels 14F to be non-steerable (S116). The front-wheel steering controller 68 outputs a front-wheel anomaly signal indicating that the steering of the front wheels 14F is non-normal to the in-vehicle network 24, together with the front-wheel steering detection angle $\theta_{FD}$ (S118), and ends the front-wheel steering control processing.

After determining that the steering of the front wheels 14F is not non-normal (No at S114), the front-wheel steering controller 68 determines whether to have received a rear-wheel anomaly signal indicating anomaly in the steering of the rear wheels 14R (S120). If the rear-wheel steering controller 74 has detected no anomaly in the steering of the rear wheels 14R, the front-wheel steering controller 68 acquires no rear-wheel anomaly signal (No at S120), and performs operation at Step S124.

After detecting anomaly in the steering of the rear wheels 14R, the rear-wheel steering controller 74 outputs a rear-wheel anomaly signal to the in-vehicle network 24. In this case, the front-wheel steering controller 68 acquires the rear-wheel anomaly signal (Yes at S120), and performs front-wheel steering offset processing, as described later (S122).

Then, the front-wheel steering controller 68 determines from the wheel speed WV whether the vehicle 10 has stopped (S124). After determining that the vehicle 10 has not stopped (No at S124), the front-wheel steering controller 68 repeats Step S102 and subsequent steps. After determining that the vehicle 10 has stopped (Yes at S124), the front-wheel steering controller 68 ends the front-wheel steering control processing.

Figure 12:
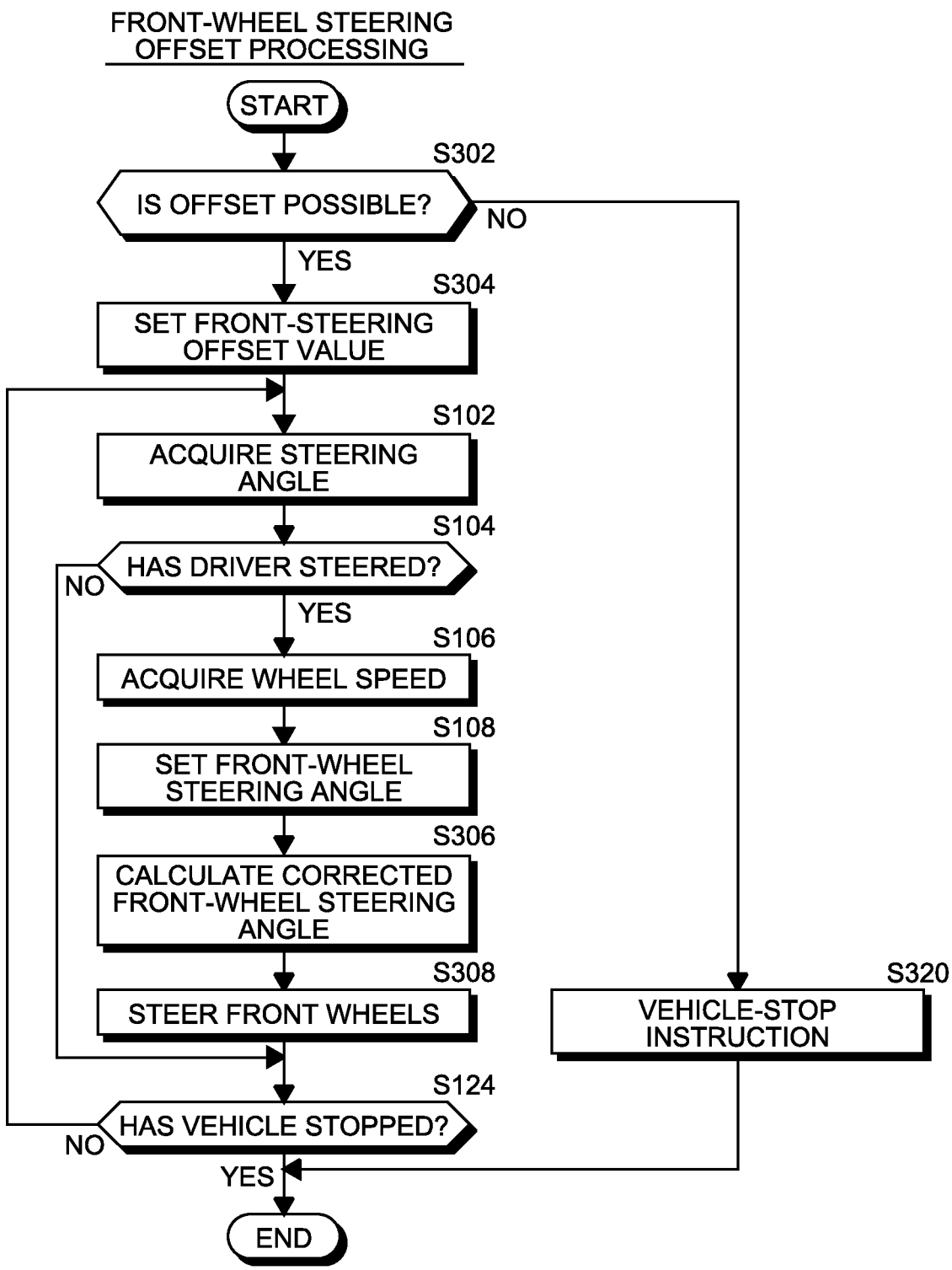
FIG. 12 is a flowchart of front-wheel steering offset processing performed by the front-wheel steering controller.

FIG. 12 is a flowchart of the front-wheel steering offset processing (S122) performed by the front-wheel steering controller 68. The front-wheel steering controller 68 performs the front-wheel steering offset processing while the steering of the rear wheels 14R exhibits anomaly and the rear wheels 14R are locked as non-steerable. The same steps as the above-described steps will be denoted by the same step numbers, and will be only briefly described.

In the front-wheel steering offset processing, as illustrated in FIG. 12, the front-wheel steering controller 68 determines whether offset is possible (S302). The front-wheel steering controller 68 may determine whether offset is possible, for example, depending on whether the wheel speed WV is equal to or higher than the speed threshold or not. Specifically, the front-wheel steering controller 68 may determine that offset is possible in the case of the wheel speed WV being a high speed equal to or higher than the speed threshold, and determine that offset is not possible in the case of the wheel speed WV being a low speed lower than the speed threshold. This is because at higher speed, the front wheels 14F are steered up to a half of the maximum front-wheel steering angle $\theta_{Fmax}$ (that is, 7.5 degrees), therefore, the front wheels 14F are steerable with an offset. Meanwhile, at lower speed, the front wheels 14F may be steered at the maximum front-wheel steering angle $\theta_{Fmax}$, so that the front wheels 14F may become non-steerable with an offset. The front-wheel steering controller 68 may determine whether offset is possible depending on whether or not the front-wheel steering detection angle $\theta_{FD}$ is equal to or smaller than the half of the maximum front-wheel steering angle $\theta_{Fmax}$. Specifically, at the front-wheel steering detection angle $\theta_{FD}$ being equal to or smaller than the half of the maximum front-wheel steering angle $\theta_{Fmax}$, the front-wheel steering controller 68 may determine that offset is possible, or determine that offset is not possible, at the front-wheel steering detection angle $\theta_{FD}$ being larger than the half of the maximum front-wheel steering angle $\theta_{Fmax}$. Alternatively, the front-wheel steering controller 68 may determine whether offset is possible, depending on whether the front-wheel steering angle $\theta_F$ and the rear-wheel steering angle $\theta_R$ are controlled in opposite phase. Specifically, the front-wheel steering controller 68 may determine that offset is possible, if the front-wheel steering angle $\theta_F$ and the rear-wheel steering angle $\theta_R$ are controlled in opposite phase, or determine that offset is not possible if the front-wheel steering angle $\theta_F$ and the rear-wheel steering angle $\theta_R$ are controlled in the same phase.

After determining that offset is not possible (No at S302), the front-wheel steering controller 68 outputs a vehicle-stop instruction (S320), and ends the front-wheel steering offset processing. In response to issuance of the stop instruction from the front-wheel steering controller 68, the wheel speed controller 79 controls a brake system to stop the vehicle 10.

After determining that offset is possible (Yes at S302), the front-wheel steering controller 68 sets the rear-wheel steering detection angle $\theta_{RD}$ in the locked state acquired together with the rear-wheel anomaly signal, as the front-steering offset value (S304).

Then, the front-wheel steering controller 68 performs operations at Steps S102 to S108 to set the front-wheel steering angle $\theta_F$. In the present embodiment, the front-wheel steering controller 68 performs operation at Step S124 upon determining at Step S104 that the driver has not steered the steering 34 (No at S104).

The front-wheel steering controller 68 calculates a corrected front-wheel steering angle $\theta_{FA}$ by correcting the set front-wheel steering angle $\theta_F$ by the front-steering offset value (S306). Specifically, the front-wheel steering controller 68 calculates the corrected front-wheel steering angle $\theta_{FA}$ by adding the front-wheel steering angle $\theta_F$ and the front-steering offset value being the rear-wheel steering detection angle $\theta_{RD}$ in the locked state.

The front-wheel steering controller 68 outputs the front-wheel steering signal based on the corrected front-wheel steering angle $\theta_{FA}$ to control the front-wheel steering driver 46 to steer the front wheels 14F to the corrected front-wheel steering angle $\theta_{FA}$ (S308). Thereafter, the front-wheel steering controller 68 repeats the operations at Step S102 and subsequent steps until the vehicle 10 is determined to have stopped (No at S124).

Rear-wheel steering control processing including rear-wheel steering offset processing of the rear-wheel steering controller 74 is substantially the same as the front-wheel steering control processing except that the object to control is not the front wheels 14F but the rear wheels 14R. Thus, the rear-wheel steering control processing will not be described.

According to the vehicle 10, as described above, with occurrence of an anomaly in either of the steering drivers 46 and 56, the front wheels 14F or the rear wheels 14R with an anomaly are locked as non-steerable, and the steering angle $\theta_F$ or $\theta_R$ of the normally operating wheels 14 is corrected in accordance with the steering angle $\theta_F$ or $\theta_R$ in the locked state to control the steering. Thereby, the vehicle 10 can travel while controlling the normally operating steering drivers 46 or 56, and thereby appropriately deal with the non-normal steering.

In the vehicle 10, the steering controllers 68 and 74 acquire the information on the steering angle $\theta_S$, to control the steering of the front and rear wheels 14. This makes it possible to omit components, such as a shaft for mechanically connecting the steering 34 to the steering drivers 46 and 56. This can simplify the mechanical steering structure of the vehicle 10 and enables the vehicle 10 to be lighter in weight.

In the vehicle 10, the steering controllers 68 and 74 set the steering angles $\theta_F$ and $\theta_R$ with reference to the different steering angle tables 70 and 76, to control the steering drivers 46 and 56. Thus, the front wheels 14F and the rear wheels 14R can be appropriately steered individually. In the vehicle 10, the steering controllers 68 and 74 set the steering angles $\theta_F$ and $\theta_R$ with reference to the steering angle tables 70 and 76, which can reduce a processing load required for setting the steering angles $\theta_F$ and $\theta_R$ in comparison with calculation of the steering angles $\theta_F$ and $\theta_R$ by mathematical expressions alone.

In the vehicle 10, the front-wheel steering controller 68 sets the front-wheel steering angle $\theta_F$ in accordance with the low-speed front-wheel steering angle $\theta_{FLn}$, the medium-speed front-wheel steering angle $\theta_{FMn}$, and the high-speed front-wheel steering angle $\theta_{FHn}$ associated with the wheel speeds WV, to control the front-wheel steering driver 46. This enables the vehicle 10 to set an appropriate front-wheel steering angle $\theta_F$ according to the wheel speed WV. In particular, the vehicle 10 sets different front-wheel steering angles $\theta_F$ in the low-speed state and in the high-speed state to be able to control the front-wheel steering driver 46 such that the vehicle 10 decreases in turning radius in the low-speed state and reduces skidding in the high-speed state. Likewise, the rear-wheel steering controller 74 controls the rear-wheel steering driver 56 in accordance with the low-speed rear-wheel steering angle $\theta_{RLn}$, the medium-speed rear-wheel steering angle $\theta_{RMn}$, and the high-speed rear-wheel steering angle $\theta_{RHn}$ associated with the wheel speeds WV. Thus, the rear-wheel steering angle $\theta_R$ can be appropriately set in accordance with the wheel speed WV.

The maximum rear-wheel steering angle $\theta_{Rmax}$ of a typical four-wheel steering vehicle is set to a half of the maximum front-wheel steering angle $\theta_{Fmax}$ or less. According to the vehicle 10, the maximum rear-wheel steering angle $\theta_{Rmax}$ is redundantly set to equal to the maximum front-wheel steering angle $\theta_{Fmax}$. This makes it possible to reduce required driving amount (for example, stroke) and force (for example, thrust force) of the front-wheel steering driver 46 to approximately half the amount and force of conventional vehicles having the same minimum turning radius. Thus, the front-wheel steering driver 46 can be reduced in size and cost. In addition, if the front-wheel steering driver 46 is placed in a non-normal state, the vehicle 10 can steer with the redundantly set rear-wheel steering driver 56. As a result, the vehicle 10 can exclude components such as a fail-safe steering mechanism for appropriately steering the vehicle 10 if the front-wheel steering driver 46 is placed in a non-normal state.

In the vehicle 10, the maximum front-wheel steering angle $\theta_{Fmax}$ is the same as the maximum rear-wheel steering angle $\theta_{Rmax}$ so that the front-wheel steering driver 46 and the rear-wheel steering driver 56 can be made of substantially the same components. This enables reduction in cost of components and simplified assembly processes of the steering drivers 46 and 56 of the vehicle 10.

Second Embodiment

Figure 13:
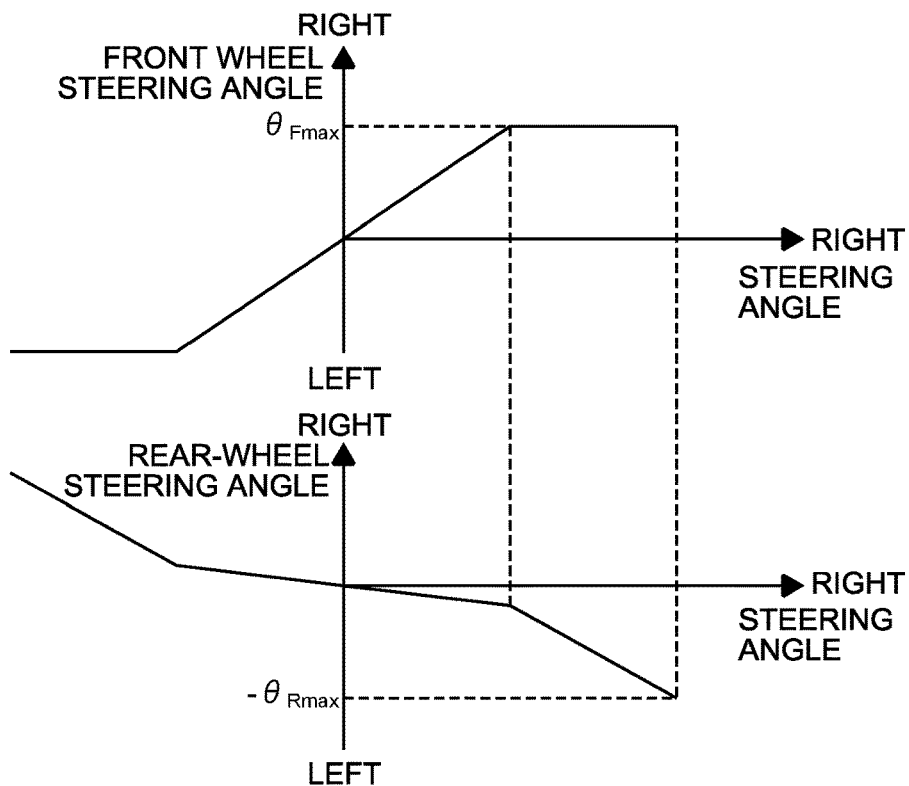
FIG. 13 is graphs representing the relations between the steering angle, and the front-wheel steering angle and the rear-wheel steering angle in a normal state while the wheel speed is a low speed lower than a speed threshold in a second embodiment.

The following describes a second embodiment that the control of the front-wheel steering angle $\theta_F$ and the rear-wheel steering angle $\theta_R$ in the low-speed state during normal state is changed. FIG. 13 illustrates graphs representing the relations between the steering angle $\theta_S$, and the front-wheel steering angle $\theta_F$ and the rear-wheel steering angle $\theta_R$ in normal state at the wheel speed WV being a low speed lower than the speed threshold according to the second embodiment.

As illustrated in FIG. 13, the rear-wheel steering controller 74 varies a rate of change in the rear-wheel steering angle $\theta_R$ relative to the steering angle $\theta_S$ in accordance with a degree of the front-wheel steering angle $\theta_F$ or the steering angle $\theta_S$. The rear-wheel steering controller 74 varies the rate of change in the rear-wheel steering angle $\theta_R$, for example, depending on whether the front-wheel steering angle $\theta_F$ is equal to or larger than the maximum front-wheel steering angle $\theta_{Fmax}$. Specifically, the rear-wheel steering controller 74 sets the rate of change in the rear-wheel steering angle $\theta_R$ to a smaller value when the front-wheel steering angle $\theta_F$ is smaller than the maximum front-wheel steering angle $\theta_{Fmax}$ than when the front-wheel steering angle $\theta_F$ is equal to or larger than the maximum front-wheel steering angle $\theta_{Fmax}$. In other words, the rear-wheel steering controller 74 sets the rate of change in the rear-wheel steering angle $\theta_R$ to a smaller value while the steering angle $\theta_S$ exhibits smaller values than while the steering angle $\theta_S$ exhibits larger values.

Thus, by the rear-wheel steering controller 74's decreasing the rate of change in the rear-wheel steering angle $\theta_R$ while the front-wheel steering angle $\theta_F$ or the steering angle $\theta_S$ exhibits smaller values, the vehicle 10 can reduce a feeling of strangeness of the driver accustomed to a two-wheel steering vehicle. By the rear-wheel steering controller 74's increasing the rate of change in the rear-wheel steering angle $\theta_R$ while the front-wheel steering angle $\theta_F$ or the steering angle $\theta_S$ exhibits larger values, the vehicle 10 can reduce the turning radius.

By varying the rate of change in the rear-wheel steering angle $\theta_R$ with reference to the maximum front-wheel steering angle $\theta_{Fmax}$ set as the boundary, the vehicle 10 can reduce a driver's feeling of strangeness in the situation that the turning radius of the vehicle 10 is small and the rear wheels 14R do not need to be steered much.

Third Embodiment

Figure 14:
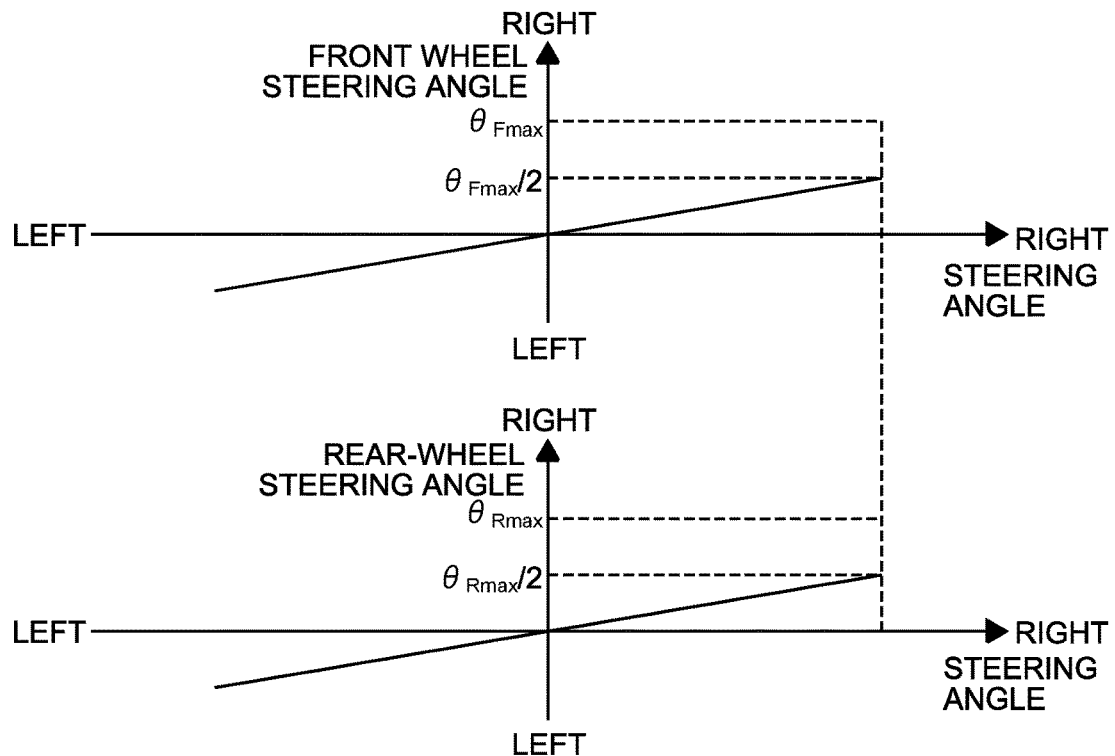
FIG. 14 is graphs representing the relations between the steering angle, and the front-wheel steering angle and the rear-wheel steering angle in a normal state while the wheel speed is a high speed equal to or higher than a speed threshold in a third embodiment.

The following describes a third embodiment that the control of the front-wheel steering angle $\theta_F$ and the rear-wheel steering angle $\theta_R$ in the high-speed state during normal state is changed. FIG. 14 illustrates graphs representing the relations between the steering angle $\theta_S$, and the front-wheel steering angle $\theta_F$ and the rear-wheel steering angle $\theta_R$ during normal state at the wheel speed WV being a high speed equal to or higher than the speed threshold according to the third embodiment. The vertical axes and the horizontal axes of FIG. 14 are the same as those of FIG. 5.

When the wheel speed WV is equal to or higher than the speed threshold in the normal state, the front-wheel steering controller 68 and the rear-wheel steering controller 74 control the front-wheel steering angle $\theta_F$ and the rear-wheel steering angle $\theta_R$, as illustrated in FIG. 14, with reference to the wheel speed WV, the steering angle $\theta_S$, the front-wheel steering angle table 70, and the rear-wheel steering angle table 76. Specifically, the front-wheel steering controller 68 and the rear-wheel steering controller 74 set the front-wheel steering angle $\theta_F$ and the rear-wheel steering angle $\theta_R$ within limits of half or less the maximum front-wheel steering angle $\theta_{Fmax}$ and the maximum rear-wheel steering angle $\theta_{Rmax}$, to control the front-wheel steering driver 46 and the rear-wheel steering driver 56. The maximum front-wheel steering angle $\theta_{Fmax}$ and the maximum rear-wheel steering angle $\theta_{Rmax}$ are equal to each other, and are the maximum steerable angles of the front wheels 14F and the rear wheels 14R. As illustrated in FIG. 14, the front-wheel steering controller 68 and the rear-wheel steering controller 74 sets the front-wheel steering angle $\theta_F$ and the rear-wheel steering angle $\theta_R$ in the same phase at the same angle for the control.

Thus, in the third embodiment, the front-wheel steering angle $\theta_F$ and the rear-wheel steering angle $\theta_R$ are set to the same angle to control the front-wheel steering driver 46 and the rear-wheel steering driver 56. This can reduce required driving amount (for example, stroke) and force (for example, thrust force) of the front-wheel steering driver 46 to approximately half the amount and force of conventional vehicles having the same minimum turning radius. As a result, the third embodiment can reduce the size and cost of the front-wheel steering driver 46.

Functions, connections, the numbers, and arrangements of the components of the above embodiments may be, for example, modified or deleted as appropriate within the scope of the invention and a scope equivalent to the scope of the invention. The embodiments may be combined as appropriate. The order of the steps in each of the embodiments may be changed as appropriate.

For example, the above embodiments have described the example of setting both of the steering angles $\theta_F$ and $\theta_R$ of the front and rear wheels 14 with reference to the steering angle tables 70 and 76. However, they are not limited to such an example. For example, as described above, the front-wheel steering controller 68 may set the front-wheel steering angle $\theta_F$ with reference to the front-wheel steering angle table 70 to control the front-wheel steering driver 46. Meanwhile, the rear-wheel steering controller 74 may set the rear-wheel steering angle $\theta_R$ in accordance with the front-wheel steering angle $\theta_F$ and a preset gain of one or less to control the rear-wheel steering driver 56. Specifically, the rear-wheel steering controller 74 may set the rear-wheel steering angle $\theta_R$ to a product of the front-wheel steering angle $\theta_F$ and the gain. Thereby, the vehicle 10 can decrease the storage capacity required for information for setting the steering angles $\theta_F$ and $\theta_R$, such as the steering angle tables.

The above embodiments have described the example that the maximum front-wheel steering angle $\theta_{Fmax}$ of the front-wheel steering driver 46 is the same as the maximum rear-wheel steering angle $\theta_{Rmax}$ of the rear-wheel steering driver 56. However, they are not limited to such an example. For example, the rear-wheel steering driver 56 may be configured to be able to steer the rear wheels 14R up to the maximum rear-wheel steering angle $\theta_{Rmax}$ equal to or larger than a half of the maximum front-wheel steering angle $\theta_{Fmax}$. For example, the maximum front-wheel steering angle $\theta_{Fmax}$ is set to 30 degrees, and the maximum rear-wheel steering angle $\theta_{Rmax}$ is set to 15 degrees. Thereby, the rear-wheel steering driver 56 performs the steering in a range above the front-wheel steering detection angle $\theta_{FD}$ of the front-wheel steering driver 46 in the non-normal state, which allows the vehicle 10 to appropriately travel. In other words, if the front-wheel steering driver 46 becomes non-normal and is locked, the rear-wheel steering controller 74 can control the rear-wheel steering driver 56 to allow the vehicle 10 to appropriately travel as long as the front-wheel steering detection angle $\theta_{FD}$ is smaller than a half of the maximum front-wheel steering angle $\theta_{Fmax}$. In particular, at speeds equal to or higher the speed threshold at which the steering is allowable up to a half of the maximum front-wheel steering angle $\theta_{Fmax}$, the vehicle 10 can be appropriately steered by the rear-wheel steering driver 56 irrespective of the non-normal state of the front-wheel steering driver 46.

The above embodiments have described the vehicle 10 including the four wheels 14, by way of example. However, the number of the wheels 14 is not limited to four. The number of the wheels 14 may be, for example, six or eight.

The above embodiments have described the example that the front-wheel steering angle table 70 includes the front-wheel steering-angle information associated with the three wheel speeds WV (that is, the low-speed front-wheel steering angle $\theta_{FLn}$, the medium-speed front-wheel steering angle $\theta_{FMn}$, and the high-speed front-wheel steering angle $\theta_{FHn}$). However, they are not limited to such an example. For example, the front-wheel steering angle table 70 may include front-wheel steering-angle information associated with two or four or more wheel speeds WV. Likewise, the rear-wheel steering angle table 76 may include rear-wheel steering-angle information associated with two or four or more wheel speeds WV.

The above embodiments have described the example that the ECUs 32, 42, 52, and 62 control the mechanisms 16, 18, 20 and 22 incorporating the ECUs 32, 42, 52, and 62, respectively. However, one ECU may be configured to control two or more of the mechanisms 16, 18, 20 and 22.

The above embodiments have described the example that both the front and rear wheels 14 are equipped with the steering sensors 48 and 58 and the locks 50 and 60. However, they are not limited to such an example. For example, either of the front and rear wheels 14 may include the steering sensors 48 and 58 and the locks 50 and 60. In this case, if either of the front and rear wheels 14 are locked, the steering offset processing is performed on the other of the wheels 14.

Certain embodiments of the present invention have been described as above, however, these embodiments are merely exemplary and not intended to limit the scope of the present invention. These novel embodiments can be implemented in other various aspects, and omission, replacement, and change can be made as appropriate without departing from the spirit of the invention. These embodiments and modifications are included in the scope and the spirit of the invention and included in an invention of appended claims and the equivalent thereof.

The invention claimed is:

1. A vehicle comprising:
a first steering driver configured to steer a first wheel pair;
a second steering driver configured to steer a second wheel pair;
a steering configured to receive an instruction steering angle;
a first steering controller configured to acquire information on the instruction steering angle of the steering and set a first steering angle based on the instruction steering angle to control the first steering driver in accordance with the first steering angle;
a second steering controller configured to acquire the information on the instruction steering angle and set a second steering angle based on the instruction steering angle to control the second steering driver in accordance with the second steering angle;
a lock configured to receive an instruction from the first steering controller to lock the first wheel pair so as to be in a non-steerable locked state; and
a detector configured to detect a steering detection angle serving as a steering angle of the first wheel pair, including, when the first wheel pair is locked by the lock in the non-steerable locked state, a locked steering detection angle serving as the steering angle at which the first wheel pair is locked by the lock in the non-steerable locked state; wherein upon detection of abnormal steering of the first wheel pair based on a determination that a difference between the instruction steering angle and the steering detection angle exceeds a predetermined threshold, and without thereafter changing the first steering angle, the first steering controller controls the lock to lock the first wheel pair so as to be in the non-steerable locked state, and while the first wheel pair is in the non-steerable locked state based on the detection of the abnormal steering of the first wheel pair, the second steering controller receives the locked steering detection angle from the detector and corrects the second steering angle to a second corrected steering angle according to the locked steering detection angle received from the detector, and controls the second steering driver in accordance with the second corrected steering angle.

2. The vehicle according to claim 1, wherein
the first steering controller sets the first steering angle on the basis of first steering-angle information to control the first steering driver, the first steering-angle information serving as information on the first steering angle set in advance, and
the second steering controller sets the second steering angle on the basis of second steering-angle information to control the second steering driver, the second steering-angle information serving as information on the second steering angle set in advance and differing from the first steering-angle information.

3. The vehicle according to claim 1, wherein
the first steering controller sets the first steering angle on the basis of first steering-angle information to control the first steering driver, the first steering-angle information serving as information on the first steering angle set in advance, and
the second steering controller sets the second steering angle on the basis of the first steering-angle information and a gain of one or less, to control the second steering driver.

4. The vehicle according to claim 2, wherein
the first wheel steering controller sets the first steering angle on the basis of the first steering-angle information, to control the first steering driver, the first steering-angle information being associated with a speed of the vehicle.

5. The vehicle according to claim 1, wherein
the first wheel pair is a front wheel pair,
the second wheel pair is a rear wheel pair,
the first steering driver is steerable of the first wheel pair up to a first maximum steering angle, and
the second steering driver is steerable of the second wheel pair up to a second maximum steering angle, the second maximum steering angle being equal to or larger than a half of the first maximum steering angle.

6. The vehicle according to claim 1, wherein
the first wheel pair is a front wheel pair,
the second wheel pair is a rear wheel pair, and
the second steering controller varies a rate of change in the second steering angle relative to the steering angle in accordance with a degree of the first steering angle.

7. The vehicle according to claim 6, wherein
the second steering controller varies the rate of change in the second steering angle depending on whether the first steering angle is equal to or larger than a maximum steering angle of the first steering driver.

8. The vehicle according to claim 1, wherein
the first steering driver sets the first steering angle within a limit of a half or less of a first maximum steering angle, to steer the first wheel pair, the first maximum steering angle serving as a maximum steering angle at which the first wheel pair is steerable, and
the second steering driver steers the second wheel pair at the second steering angle of the same degree as the first steering angle.

* * * * *